(12) United States Patent
Yamada et al.

(10) Patent No.: US 11,531,147 B2
(45) Date of Patent: Dec. 20, 2022

(54) TRANSPARENT SCREEN, VIDEO PROJECTION LAMINATED PLATE, AND VIDEO DISPLAY SYSTEM

(71) Applicant: AGC Inc., Chiyoda-ku (JP)

(72) Inventors: Naruki Yamada, Chiyoda-ku (JP); Yukihiro Tao, Chiyoda-ku (JP); Tsuneo Ichimatsu, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 436 days.

(21) Appl. No.: 16/871,802

(22) Filed: May 11, 2020

(65) Prior Publication Data

US 2020/0271832 A1 Aug. 27, 2020

Related U.S. Application Data

(63) Continuation of application No. PCT/JP2018/042019, filed on Nov. 13, 2018.

(30) Foreign Application Priority Data

Dec. 20, 2017 (JP) .............................. JP2017-243475

(51) Int. Cl.
*G02B 5/02* (2006.01)
*G02B 27/01* (2006.01)
(Continued)

(52) U.S. Cl.
CPC ....... *G02B 5/0221* (2013.01); *G02B 27/0101* (2013.01); *G03B 21/14* (2013.01); *G03B 21/60* (2013.01)

(58) Field of Classification Search
CPC ... G02B 5/0221; G02B 27/0101; G03B 21/60
(Continued)

(56) References Cited

FOREIGN PATENT DOCUMENTS

CN 104298063 A * 1/2015 ............. G03B 21/60
WO WO 2015/186668 A1 12/2015

OTHER PUBLICATIONS

Machine Translation 104298063 (Year: 2022).*
(Continued)

*Primary Examiner* — Jerry L Brooks
(74) *Attorney, Agent, or Firm* — Oblon, McClelland, Maier & Neustadt, L.L.P.

(57) ABSTRACT

There is provided a transparent screen which is capable of separating a direction where a hot spot is observed and a direction where a bright video is allowed to be observed, and establishing a direction where a video is allowed to be wholly brightly observed.

A transparent screen includes a first transparent layer, a reflective layer reflecting projected video light, a second transparent layer disposed opposite to the first transparent layer with respect to the reflective layer so as to make a background visible therethrough; wherein the reflective layer has a plurality of slant reflective surfaces, each of the slant reflective surfaces being slant to a reference surface that is a surface of the first transparent layer opposite to the reflective layer; wherein each of the slant reflective surfaces is provided with a concavo-convex and is formed in a stripe shape when seen from a normal direction of the reference surface; and wherein the slant reflective surfaces are disposed so as to have angles to the reference surface, the angle changing with random variations in of range with respect to a certain central angle.

17 Claims, 20 Drawing Sheets

(51) Int. Cl.
*G03B 21/14* (2006.01)
*G03B 21/60* (2014.01)

(58) Field of Classification Search
USPC .......................................................... 359/13
See application file for complete search history.

(56) References Cited

OTHER PUBLICATIONS

International Search Report dated Jan. 15, 2019 in PCT/JP2018/042019 filed Nov. 13, 2018, 2 pages.
U.S. Appl. No. 15/937,118, filed Mar. 27, 2018, US 2018-0239066 A1, Yuko Tachibana et al.
U.S. Appl. No. 16/837,022, filed Apr. 1, 2020, Naruki Yamada et al.

* cited by examiner

Fig. 7 (Experimental Example 2) Central angle: 5° Change rate (Variation): ±20% (1°)

(Experimental Example 7) Central angle: 30°
Change rate (Variation): ±20% (6°)

(Experimental Example 8)   Central angle: 30°
Change rate (Variation): ±30% (9°)

TRANSPARENT SCREEN, VIDEO PROJECTION LAMINATED PLATE, AND VIDEO DISPLAY SYSTEM

TECHNICAL FIELD

The present invention relates to a transparent screen, a laminated plate for video projection, a video display system and a process for producing the transparent screen.

BACKGROUND ART

The video projecting structure disclosed in the following Patent Document 1 includes a first transparent layer having a random concavo-convex on a surface thereof, a reflective film formed on the surface of the first transparent layer with the random concavo-convex thereon; and a second transparent layer formed on the reflective film. The video projecting structure serves as a transparent window when no video is projected. On the other hand, the video projecting structure serves as a screen when a video is projected.

PRIOR ART DOCUMENT

Patent Document

Patent Document 1: WO2015/186668

DISCLOSURE OF INVENTION

Technical Problem

FIG. 24 is a view illustrating a conventional transparent screen. The transparent screen 120 displays, toward an observer 113, a video projected from a projector 112. The transparent screen 120 includes a first transparent layer 132, a reflective layer 133 reflecting projected video light, and a second transparent layer 135 disposed on a side opposite to the first transparent layer 132 with respect to the reflective layer 133. The first transparent layer 132 has a concavo-convex on a flat surface thereof in contact with the reflective layer 133. The reflective layer 133 is disposed along the concavo-convex.

Such transparent screens are subjected to a phenomenon called hot spot at times. The hot spot is a phenomenon that when a video is projected on a screen from a projector, the screen is seen to shine brightly in a central portion thereof. The hot spot is generated by regular reflection of incident light on a surface of the screen in contact with atmospheric air and is observed in a regular reflection direction.

In the conventional screens, a direction where a hot spot is observed and a direction where a bright video is observed are the same direction. No direction where an entire video is brightly observed has existed in the conventional screens. When a video is observed from one direction, the difference between the brightness in a central portion of a video and the brightness in a peripheral portion of the video is significant.

It is an object of the present invention is to provide a transparent screen which is capable of separating a direction where a hot spot is observed and a direction where a bright video is allowed to be observed, and establishing a direction where a video is allowed to be wholly brightly observed.

Solution to Problem

The present invention provides a transparent screen, which includes a first transparent layer, a reflective layer reflecting projected video light, a second transparent layer disposed opposite to the first transparent layer with respect to the reflective layer so as to make a background visible therethrough; wherein the reflective layer has a plurality of slant reflective surfaces, each of the slant reflective surfaces being slant to a reference surface that is a surface of the first transparent layer opposite to the reflective layer; wherein each of the slant reflective surfaces is provided with a concavo-convex and is formed in a stripe shape when seen from a normal direction of the reference surface; and wherein the slant reflective surfaces are disposed so as to have angles to the reference surface, the angles changing with random variations in a certain amount of range with respect to a certain central angle.

The present invention also provides a process for producing a transparent screen, which includes a first transparent layer, a reflective layer reflecting projected video light, and a second transparent layer disposed opposite to the first transparent layer with respect to the reflective layer so as to make a background visible therethrough; the process including a step of forming a plurality of slant surfaces on a surface of the first transparent layer opposite to a reference surface that is a surface of the first transparent layer opposite to the reflective layer, the slant surfaces being slant to the reference surface and being formed in a stripe shape when seen from a normal direction of the reference surface; a step of providing each of slant surfaces with a concavo-convex; a step of disposing the reflective layer in contact with the concavo-convex; and a step of disposing a second transparent layer so as to fill a concavo-convex of the reflective layer; wherein the slant reflective surfaces are disposed so as to have angles to the reference surface, the angles changing with random variations in a certain amount of range with respect to a certain central angle.

Advantageous Effects of Invention

In accordance with the present invention, it is possible to provide a transparent screen which is capable of separating a direction where a hot spot is observed and a direction where a bright video is allowed to be observed, and establishing a direction where a video is allowed to be wholly brightly observed.

DESCRIPTION OF EMBODIMENTS

Now, embodiments where the present invention is implemented will be described in reference to the accompanying drawings. In Description, an observer side is called a front side on the basis of a transparent screen while an opposite side of the observer is called a rear side on the basis of the transparent screen. In the respective figures, like or corresponding elements or parts are denoted by like or corresponding numerical numbers.

(Video Display System)

Figure 1:
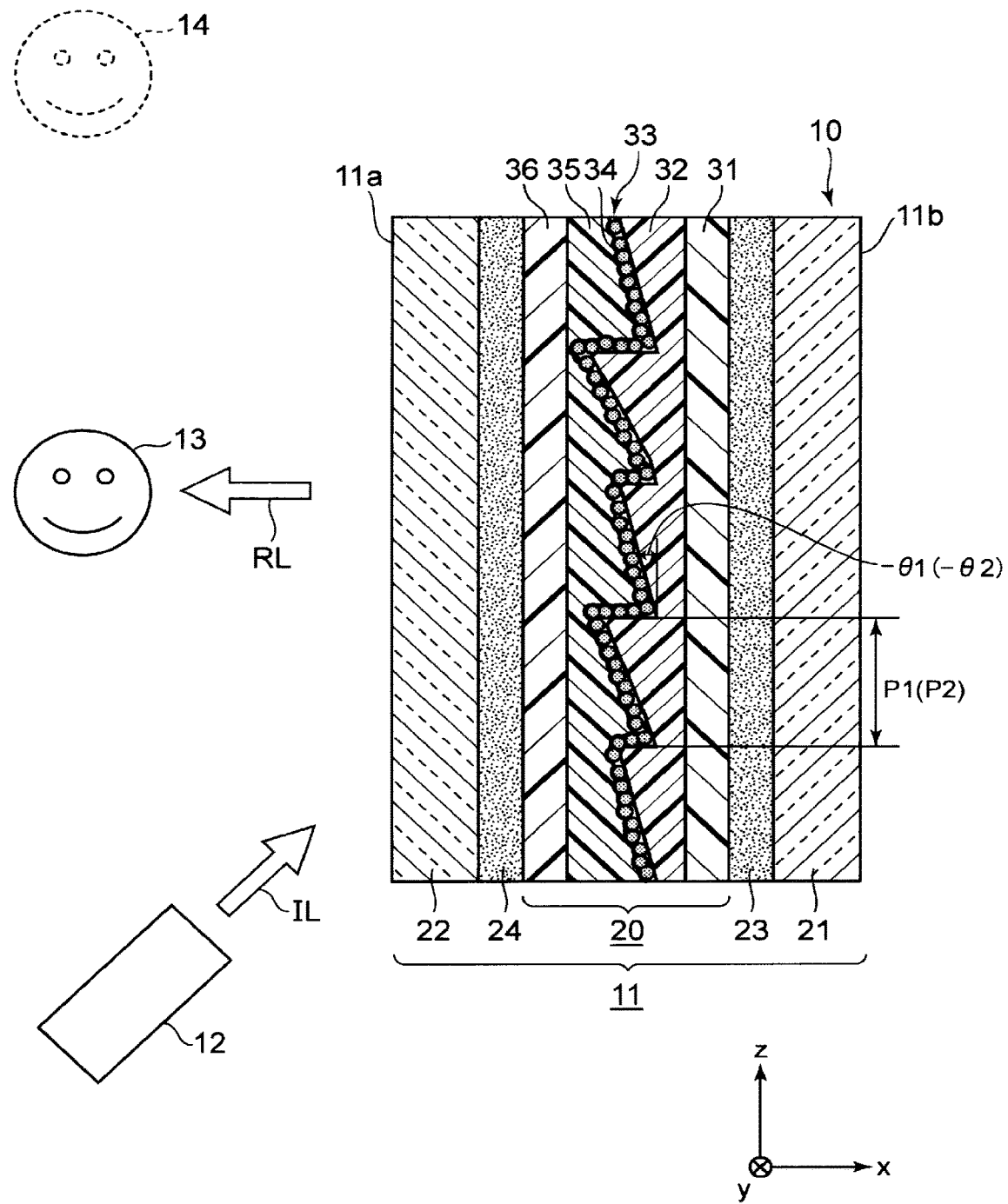
FIG. 1 is a schematic view illustrating an embodiment of the video display system according to the present invention.

FIG. 1 is a schematic view illustrating an embodiment of the video display system according to the present invention. In FIG. 1, the structure of a transparent screen 20 is illustrated in enlargement.

The video display system 10 includes a laminated plate 11 for video projection and allowing a background to be visible therethrough, and a projector 12 projecting a video on the laminated plate 11. The projector 12 may be a typical one.

(Laminated Plate for Video Projection)

The laminated plate 11 displays, to an observer 13 on the front side, a video projected from the front side, and allows a background on the rear side to be visible to the observer 13 on the front side therethrough. It is sufficient that the background on the rear side is visible when no video is projected. The background on the rear side may be visible or invisible when a video is projected.

The laminated plate 11 includes a forward surface (front surface 11a) in contact with atmospheric air and a backward surface (rear surface 11b) in contact with the atmospheric air. Incident light IL undergoes regular reflection on the front surface 11a or the rear surface 11b to cause a hot spot. The hot spot is observed at a position in a regular reflection direction (for example, a position where an observer 14 denoted by dotted lines is present) and is not observed at any other positions (for example, a position where the observer 13 denoted by solid lines is present).

The laminated plate 11 may be either a flat plate or a curved plate. When the laminated plate is a curved plate, the curved plate may be either a plate convex toward the observer 13 or a plate concave toward the observer 13.

There is no limitation to the use of the laminated plate 11. Examples of the laminated plate, a window plate for a vehicle, such as an automobile or rolling stock, a window plate for a building, a window plate for a show window, a window plate for a refrigerating showcase, and a partition which undergoes partitioning in a vehicle or in a building.

The laminated plate 11 includes the transparent screen 20, a first transparent plate 21 disposed on one side of the transparent screen 20 (for example, a rear side) and a second transparent plate 22 disposed on the opposite side of the transparent screen 20 (for example, a front side).

The transparent screen 20 displays, to the observer 13 on the front side, a video projected from the front side, and allows a background on the rear side to be visible to the observer 13 on the front side therethrough. The structure of the transparent screen 20 will be described later.

(Transparent Plate)

Each of the first transparent plate 21 and the second transparent plate 22 may be, for example, a glass plate. In this case, the laminated plate 11 forms laminated glass. The process for producing the laminated glass may include the following steps (1) to (3), for example. (1) A laminate, where a glass plate as the first transparent plate 21, a first adhesive layer 23, the transparent screen 20, a second adhesive layer 24 and a glass plate as the second transparent plate 22 are stacked in this order, is put in a vacuum bag. The stacking order may be reversed. (2) While the inside of the vacuum bag with the laminate put therein is evacuated, the vacuum bag is pressurized and heated, for example, in an atmospheric furnace. (3) The laminate taken out from the vacuum bag is pressurized and heated in an autoclave.

Examples of the glass for the glass plates include soda lime glass, aluminosilicate glass, alkali-free glass, borosilicate glass. The glass may be either non-strengthened glass or strengthened glass. The non-strengthened glass is one obtained by forming molten glass in a plate shape and annealing the formed glass. Examples of the forming method include a float method and a fusion method. The strengthened glass may be either physically strengthened glass or chemically strengthened glass. The physically strengthened glass has a glass surface strengthened by quenching an equally heated glass plate from a temperature in the vicinity of the softening point and utilizing a temperature difference between the glass surface and the inside of the glass to generate compressive stresses in the glass surface. The chemically strengthened glass has a glass surface strengthened by using, for example, an ion exchange method to generate compressive stresses in the glass surface.

Each of the glass plates may be either a flat plate or a curved plate. A flat plate may be bent in a curved plate by gravity bending and press bending. During bending, each of the glass plates may have a glass surface strengthened by quenching an equally heated glass plate from a temperature in the vicinity of the softening point and utilizing a temperature difference between the glass surface and the inside of the glass to generate compressive stresses in the glass surface. In this case, physically strengthened glass is obtained. Chemically strengthened glass is obtained by using, for example, an ion exchange method to generate compressive stresses in the glass surface after bending.

There is no limitation to the thickness of the glass plates. The glass plates have a thickness of 0.1 mm to 20 mm, for example. It should be noted that in the numeral ranges having an expression including the wording "to" in Description, upper and lower limits before and after the wording "to" are inclusive.

Each of the first transparent plate 21 and the second transparent plate 22 may be a resin plate. One of the first transparent plate 21 and the second transparent plate 22 may be a glass plate while the other may be a resin plate. The laminated plate 11 may include at least three transparent plates. The laminated plate may be configured to have the transparent screen 20 bonded to the first transparent plate 21 by the first adhesive layer 23 without including the second transparent plate 22. The laminated plate may be configured to have the transparent screen 20 bonded to the first transparent plate 22 by the second adhesive layer 24 without including the first transparent plate 21.

(Adhesive Layer)

The first adhesive layer 23 bonds the first transparent plate 21 and the transparent screen 20. The second adhesive layer 24 bonds the second transparent plate 22 and the transparent screen 20. There is no limitation to the thickness of each of the first adhesive layer 23 and the second adhesive layer 24. Each of the first adhesive layer 23 and the second adhesive layer 24 has a thickness of, e.g. 0.01 mm to 1.5 mm, preferably 0.3 mm to 0.8 mm.

Although the first adhesive layer 23 and the second adhesive layer 24 may be made of different materials, both layers are preferably made of the same material. The first adhesive layer 23 and the second adhesive layer 24 may be made of, for example, a thermoplastic resin, a thermosetting resin or an ultraviolet curable resin. Both layers are made of at least one kind selected from the group consisting of a vinyl-based polymer, an ethylene-vinyl-based copolymer, a styrene-based copolymer, a cycloolefin-based copolymer, a polyurethane resin, a urethane acrylate resin, a fluorinated resin and an acrylic resin.

The thermoplastic resin may be, for typical example, a polyvinyl butyral resin (PVB) or an ethylene-vinyl acetate copolymer resin (EVA). The thermosetting resin may be, for typical example, a urethane acrylate resin. In the case of a thermoplastic resin or a thermosetting resin, bonding is conducted by heat treatment. On the other hand, in the case of an ultraviolet curable resin, bonding is conducted by irradiation with ultraviolet light. The urethane acrylate resin is also curable by ultraviolet light.

Each of the first adhesive layer 23 and the second adhesive layer 24 is preferably formed by at least one kind selected from the group consisting of an acrylic resin, a silicone resin and an urethane acrylate resin from the viewpoint of both of excellent adhesiveness between the transparent screen 20 and the first transparent plate 21 and/or the second transparent plate 22, and excellent transparency.

(Transparent Screen)

The transparent plate 20 has a haze value of at most 10%, preferably 0.1% to 2% because of having transparency enough to make a background visible in a good way. The haze value of a glass plate utilized as the first transparent plate 21 and the second transparent plate 22 is normally at most 1%.

The haze value is measured in accordance with Japanese Industrial Standards (JIS) K7136. The haze value is found as the percentage of transmitted light deviated by at least 2.5° from the incident light by forward scattering, among the transmitted light transmitted through a test plate as a measured object in the thickness direction of the test plate. As the light source utilized for measuring the haze value, D65 light source as described in JIS Z8720: 2012 may be used.

The transparent screen 20 may be inflexible or flexible so as to be deformable in various shapes.

Figure 2:
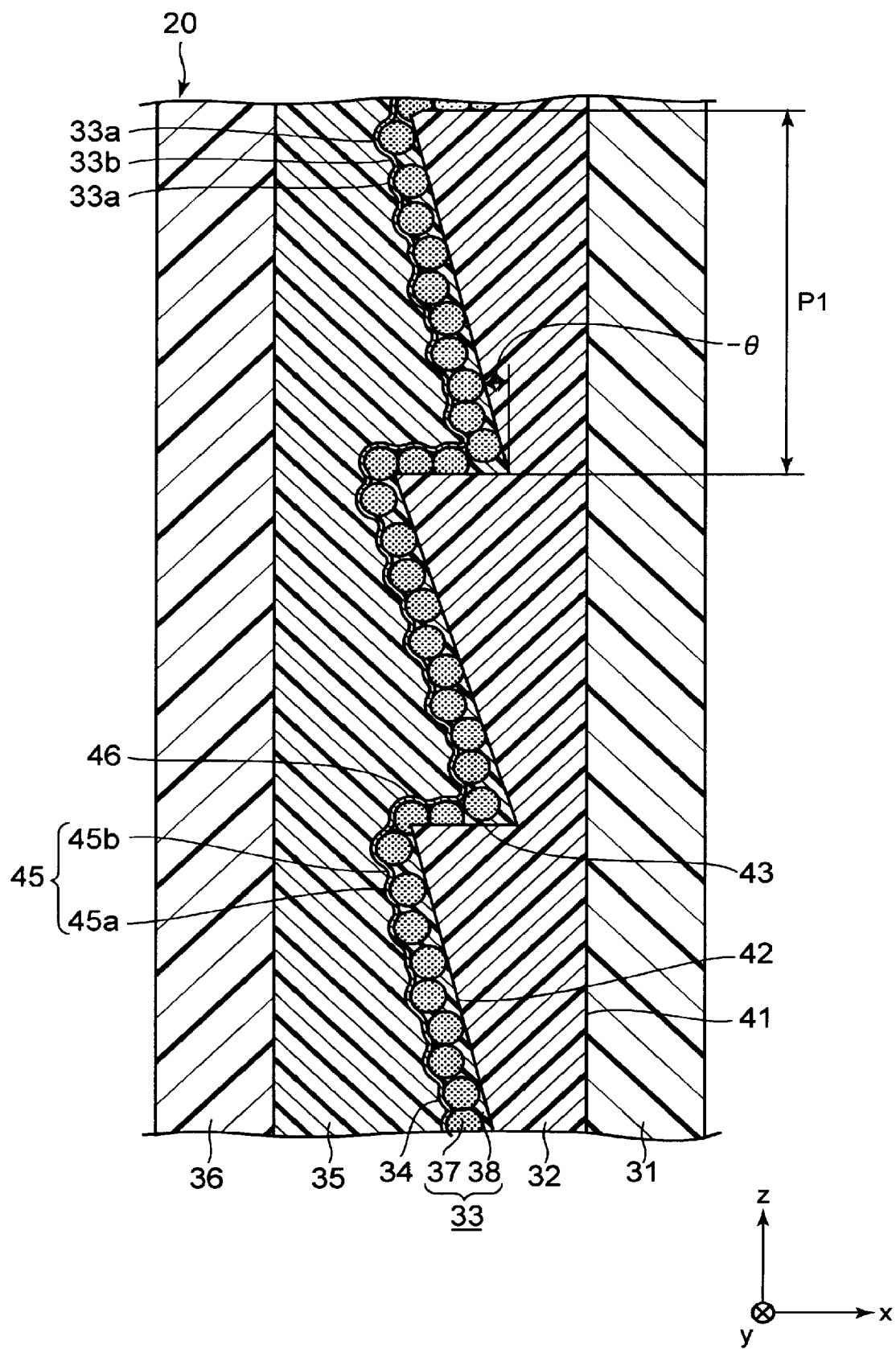
FIG. 2 is a schematic view illustrating an embodiment of the transparent screen.

FIG. 2 is a schematic view illustrating an embodiment of the transparent screen according to the present invention. In FIG. 2, the transparent screen is shown to have a reflective layer 34 provided with slant reflective surfaces 45 thereon, the slant reflective surface having a concavo-convex exaggeratedly illustrated in this figure. The transparent screen 20 is configured to have a substrate sheet 31, a first transparent layer 32, the reflective layer 34, a second transparent layer 35, a protective sheet 36 and so on in this order from the rear side toward the front side.

Although the substrate sheet 31 may be either a transparent glass sheet or a transparent resin sheet, the substrate sheet is preferably a transparent resin sheet from the viewpoint of flexibility. The transparent resin sheet may be, for example, formed by a polycarbonate, a polyethylene terephthalate (PET), a polyethylene naphthalate (PEN), a cycloolefin polymer, or a polyester.

The first transparent layer 32 is formed on a surface of the substrate sheet 31 and has a concavo-convex on a surface thereof opposite to the substrate sheet 31. The first transparent layer 32 may be, for example, formed by a transparent resin. The resin may be any one of a photocurable resin, a thermoplastic resin and a thermosetting resin and may be, for example, molded by an imprinting method.

The reflective layer 34 is formed zigzag along the concavo-convex on the first transparent layer 32. The reflective layer 34 has a concavo-convex on a front side thereof to display a video by forwardly diffusing and reflecting video light projected from forward. The reflective layer 34 allows part of light from the rear side to be forwardly transmitted therethrough, making a background visible. The concavo-convex on the first transparent layer 32 is preferably an irregular concavo-convex.

The reflective layer 34 may be formed by a material reflecting light, for example, a metal such as aluminum or silver, a metal oxide or a metal nitride. The reflective layer 34 may have either a single layer structure or a multilayer structure. The reflective layer 34 may include at least one of a metal layer and a dielectric layer. As the method for forming the reflective layer 34, a vacuum vapor deposition method, a sputtering method or another method is applicable.

The reflective layer 34 may include a dielectric multilayer film. The dielectric multilayer film may be formed by a method for laminating a plurality of dielectric films having different refractive indexes. As examples of a dielectric film having a high refractive index, $Si_3N_4$, AlN, NbN, $SnO_2$, ZnO, SnZnO, $Al_2O_3$, MoO, NbO, $TiO_2$ and $ZrO_2$ are mentioned. As examples of a dielectric film having a lower refractive index than such a dielectric film having a high refractive index, $SiO_2$, $MgF_2$ and $AlF_3$ are mentioned.

The second transparent layer 35 fills the concavo-convex of the reflective layer 34. The second transparent layer 35 may be formed by a transparent resin as in the first transparent layer 32. The second transparent layer 35 is preferably formed by a resin having substantially the same refractive index as the first transparent layer 32.

The protective sheet 36 may be formed in a similar way to the substrate sheet 31. The protective sheet 36 is preferably formed by the same material as the substrate sheet 31. It should be noted that the substrate sheet 31 and the protective sheet 36 are optional elements. In other words, it is acceptable that the transparent screen 20 does not include at least one of the substrate sheet 31 and the protective sheet 36.

(Details of Transparent Screen)

The first transparent layer 32 is formed in a saw tooth shape in a cross-sectional view. When a side of the first transparent layer 32 opposite to the reflective layer 34 is defined as a reference surface 41, the first transparent layer 32 has a plurality of slant surfaces 42 slant to the reference surface 41. Each of the slant surfaces 42 is formed in a stripe shape as seen from a normal direction of the reference surface 41. The stripe shape may be straight or curved. When the stripe shape is curved, the stripe shape may include a concentric pattern or an oval pattern.

Now, the dimensions, the shape and so on of each of the slant surfaces 42 will be described. In order to explain about the slant surfaces 42, the normal direction of the reference surface 41 is defined as an x direction, the extending direction of each of the slant surfaces 42 that is perpendicular to the x direction is defined as a y direction, and the arrangement direction of the slant surfaces 42 perpendicular to the x direction and the y direction is defined as a z direction as illustrated in FIGS. 1 and 2.

When the transparent screen 20 has a front surface directed to left in section perpendicular of the y direction as illustrated in FIGS. 1 and 2, each of the slant surfaces has a slant angle θ1 (greater than −90° and smaller than 90°), which is defined as having a plus value in a clockwise direction and a minus value in an counterclockwise direction. When a slant surface 42 has a slant angle θ1 of 0°, it is meant that this slant surface 41 is parallel to the reference surface 41. In FIGS. 1 and 2, the slant angle θ1 has a value represented by "−θ1" since the slant angle θ1 is negative.

The slant angle θ1 of each of the slant surfaces 42 may be set based on a positional relationship among the projector 12, the observer 13 and the transparent screen 20, the refractive index of the transparent screen 20 and another factor. The reason why the refractive index of the transparent screen 20 is taken into consideration is that the incident light IL or reflection light RL is refracted at the boundary between the transparent screen 20 and the atmospheric air. The slant angle θ1 of each of the slant surfaces 42 may be set such that when the observer 13 observes a video at a preset position, no hot spot is not observed by the observer, and such that the video is wholly brightly observed.

It should be noted that the slant surfaces 42 do not necessarily have the same slant angle θ1 as described in detail later. In this embodiment, the slant surfaces 42 have dispersed values in the slant angles θ1.

Each of the slant surfaces 42 has a slant angle θ1 of, for example, −42° to 42°, preferably −30° to 30°, more preferably −25° to 25°. In a case where the transparent screen 20 is applied to, for example, the windshield of an automobile to be utilized in a tilted position to an observer 13; (1) when the projector 12 is a long focus projector, it is sufficient that each of the slant surfaces 42 has a slant angle θ1 of −24° to 18°, and each of the slant surfaces 42 has a slant angle θ1 of preferably −20° to 15°, more preferably −16° to 12°; and (2) when the projector 12 is a short focus projector, it is sufficient that each of the slant surfaces 42 has a slant angle θ1 of −27° to 30°, and each of the slant surfaces 42 has a slant angle θ1 of preferably −23° to 25°, more preferably −18° to 19°. On the other hand, in a case where the transparent screen 20 is applied to, for example, a windowpane of a railcar or a building, a partition in a room or a display screen of a refrigerator so as to be placed parallel to an observer 13, it is sufficient that each of the slant surfaces 42 has a slant angle θ1 of 4° to 32°, and each of the slant surfaces 42 has a slant angle θ1 of preferably 5° to 28°, more preferably 6° to 24°.

The slant surfaces 42 may be formed such that the slant angles θ1 measured for the respective slant surfaces 42 stepwise or sequentially decreasing from one end in the z direction (for example, a lower end) toward the other end in the z direction (for example, an upper end) in section perpendicular to the y direction in at least part of a video projection area. For example, the uppermost slant surface 42 in FIG. 1 may have a slant angle θ1 (having a negative value) set so as to be smaller than the slant angle θ1 (having a negative value) of the lowermost slant surface 42 in FIG. 1. The slant angles θ1 of the slant surfaces 42 may vary only in a negative range, only in a positive range, or in both of positive and negative ranges.

The slant surfaces 42 have a pitch P1 of, for example, at least 15 μm, preferably at least 20 μm. When the pitch P1 is at least 15 μm, the emission angle of diffracted light having the most intense power among the diffracted light described later can be decreased to minimize a case where multiple images in a video are recognized as a ghost. The pitch P1 is at most 300 μm. When the pitch P1 is at most 300 μm, the stripe of the slant surfaces 42 is too narrow to be visible to an observer 13.

Between adjacent slant surfaces 42 is formed a step surface 43 to connect the adjacent slant surfaces 42. Although step surfaces 43 are shown to be perpendicular to the reference surface 41 in FIG. 2, the step surfaces 43 may be slant to the reference surface 41. It should be noted that a parallel surface parallel to the reference surface 41, in addition to such a step surface 43, may be formed between adjacent slant surfaces 42.

The ratio (PV1/P1) of the height PV1 of the step surfaces 43 in the x direction to the pitch P1 is preferably at most 0.6. PV1 can be calculated based on the central angle of the slant angles θ1. The central angle is a reference angle that is obtained when the slant angles θ1 of the slant surfaces 42 are dispersed.

When PV1/P1 is at most 0.6, the absolute values of the slant angles θ1 of most of the slant surfaces 42 can decrease to at most 45° to minimize forward scattering and reduce noise. PV1/P1 is preferably at least 0.01, more preferably at least 0.05, furthermore preferably at least 0.1, which is preferred in terms of readily obtaining a video having a good visibility.

The transparent screen 20 further includes a concavo-convex layer 33 formed between the first transparent layer 32 and the reflective layer 34 to provide the slant surfaces 42 of the first transparent layer 32 with a concavo-convex. The concavo-convex layer 33 includes particles 37 and a matrix 38.

Each of the particles 37 is at least one of an inorganic material and an organic material. As the inorganic material, a silicon dioxide, a partially nitrided silicon oxide, a titanium oxide, an aluminum oxide, a mixed crystal material of a silicon oxide and an aluminum oxide, a zirconium oxide, a zinc oxide and so on are mentioned. As the organic material, a polystyrene resin, an acrylic resin, a polyurethane resin and so on are mentioned.

The matrix 38 includes at least one of an inorganic material and an organic material. As the inorganic material, a silicon dioxide, a titanium oxide, a zirconia oxide, sodium silicate and so on are mentioned. As the organic material, a polyvinyl alcohol resin, a polyvinyl butyral resin, an epoxy resin, an acrylic resin, a polyester resin, a polycarbonate resin, a melamine resin, a polyurethane resin, a urethane acrylate resin, a silicone resin and so on are mentioned. The organic material may be any one of a thermosetting resin, a photocurable resin and a thermoplastic resin.

The absolute value of the refractive index difference between the particles 37 and the matrix 38 is preferably as small as possible, for example, at most 0.1, preferably at most 0.05, more preferably at most 0.02. The absolute value of the refractive index difference is preferably as small as possible, for example, at most 0.1, preferably at most 0.05, more preferably at most 0.02. Further, the absolute value of the refractive index difference between the matrix 38 and the first transparent layer 32 is preferably as small as possible, for example, at most 0.1, preferably at most 0.05, more preferably at most 0.02.

The ratio (volume) occupied by the particles in the concavo-convex layer 33 is, for example, 1% to 80%, preferably 5% to 60%.

The concavo-convex layer 33 has a concavo-convex on a surface in contact with the reflective layer 34 and is configured to have convex portions 33a and concave portions 33b alternately arranged in section perpendicular to the y direction.

With regard to the regularity of the concavo-convex shape of the concavo-convex layer 33, the regularity can be readily achieved by reducing the variations in the particle sizes of the particles 37. In contrast, the regularity can be broken to make the concavo-convex in a random fashion when the variations in the particle sizes of the particles 37 increase. Further, the concavo-convex may be made in a random fashion by reducing the total volume of the particles 37 to the volume of the matrix 38. The regularity can be reduced by setting the total volume of the particles 37 at at most 100% of the volume of the matrix 38.

In contrast, when the concavo-convex shape of the concavo-convex layer 33 is provided with a regularity, it is possible to have an increased luminance because the scattering directions of light are readily aligned with one another.

The concavo-convex layer 33 has a surface roughness Ra set to be sufficiently shorter than the length L1 of a slant surface 42 in its slant direction (L1=|P1/cos(θ1)|). The surface roughness Ra is, for example, 0.01 μm to 10 μm. In Description, "surface roughness Ra" is arithmetic average roughness prescribed in JIS B0601. The surface roughness Ra of the concavo-convex layer 33 is measured in the y direction. The surface roughness Ra of the concavo-convex layer 33 is measured in the y direction, not in the z direction, in order to prevent noise that is produced when the first transparent layer 32 is formed in a saw tooth shape in section perpendicular to the y direction.

The reflective layer 34 has a thickness of, for example, 5 nm to 5,000 nm and is formed along the concavo-convex of the concavo-convex layer 33. For this reason, the reflective layer 34 not only is slant to the reference surface 41 but also has the slant reflective surfaces 45 reflecting projected video light. Between adjacent slant reflective surfaces 45 are formed a step surface 46 and so on. The slant reflective surfaces 45 are formed in a stripe shape as seen from a normal direction of the reference surface 41. The stripe shape may be straight or curved.

The dimensions, the shape and so on of each of the slant reflective surfaces 45 will be described in reference to FIG. 3 and so on. In order to explain about the slant reflective surfaces 45, the x direction, the y direction, the z direction will be referred to an in the explanation about the slant surfaces 42. The y direction is a direction perpendicular to the x direction and extending of each of the slant reflective surfaces 45. The z direction is a direction perpendicular to the x direction and the y direction, where the slant reflective surfaces 45 are side by side.

Figure 3:
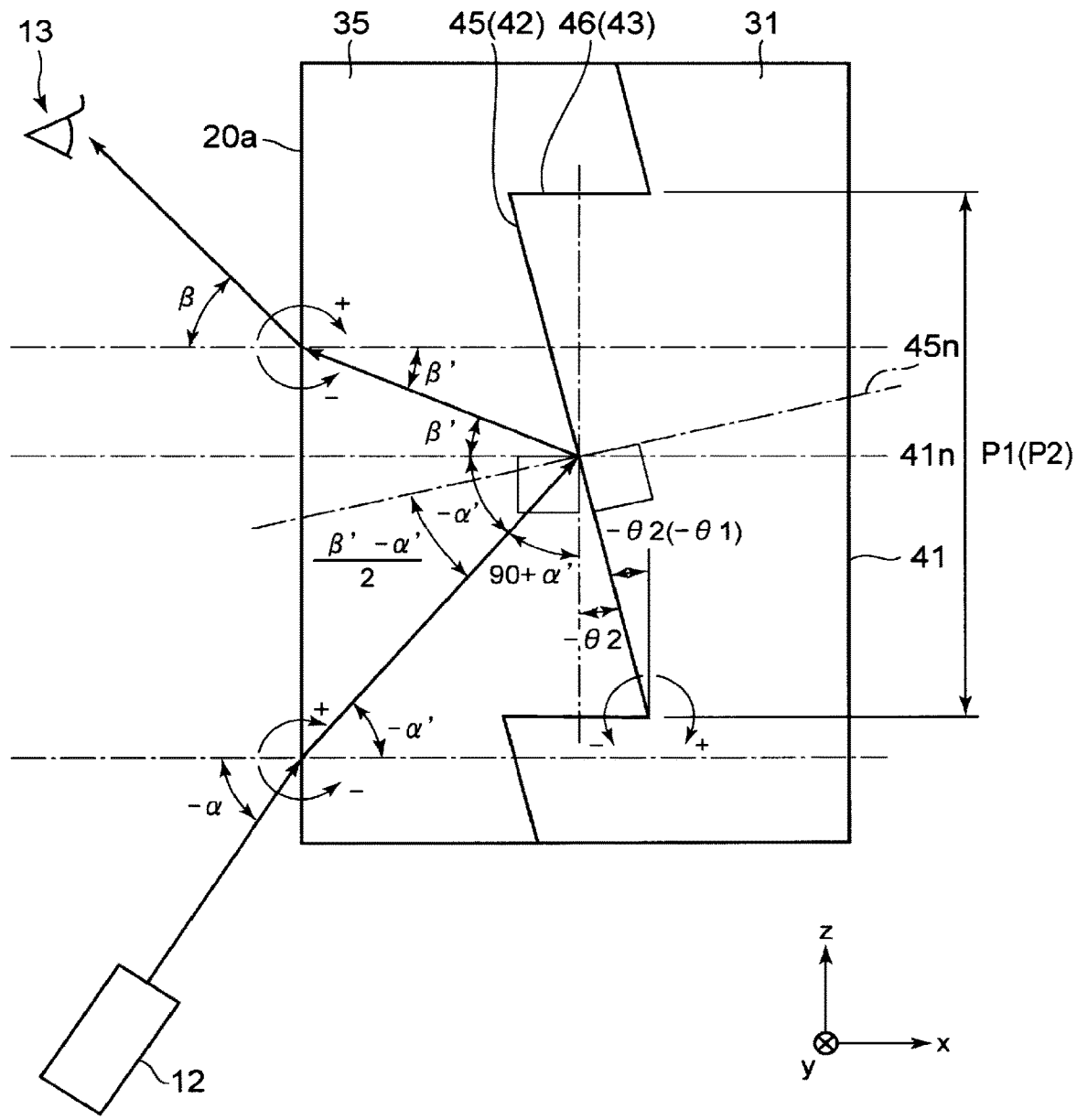
FIG. 3 is a schematic diagram illustrating a path where video light projected from a projector is reflected on a slant reflective surface and reaches an observer.

FIG. 3 is a schematic diagram illustrating a path where video light projected from a projector is reflected on a slant reflective surface 45 and reaches an observer. As illustrated in FIG. 3, the video light projected from the projector 12 is incident on a front surface 20a of the transparent screen 20 at a first incident angle $\alpha$ and is refracted at a first refractive angle $\alpha'$ by the front surface in section perpendicular to the y direction. Next, the video light is reflected by the slant reflective surface 45, which is slant at a slant angle of θ2 to the reference surface 41. Subsequently, the video light is incident on the front surface 20a of the transparent screen 20 at a second incident angle $\beta'$ and is refracted at a second refractive angle $\beta$ by the front surface, followed by entering an eye of the observer 13. It should be noted that FIG. 3 illustrates a normal line 45n of the slant reflective surface 45 and a normal line 41n of the reference surface 41 as well.

The first incident angle $\alpha$ representing the position of the projector 12, and the second refractive angle $\beta$ representing the position of the observer 13 may be properly set according to the usage of the transparent screen 20. Each of the slant reflective surfaces 45 may have these angles set independently in the other slant reflective surfaces. The slant reflective surfaces 45 may have first incident angles $\alpha$ and second refractive angles $\beta$ set in the same way for a group of successive slant reflective surfaces 45.

The first refractive angle $\alpha'$ and the second incident angle $\beta'$ may be set according to the formula of Snell's law. Specifically, the first refractive angle $\alpha'$ may be set by substituting a relative refractive index n of the material present just in front of a slant reflective surface 45 to atmospheric air (the second transparent layer 35 in a case shown in FIG. 3) and the first incident angles $\alpha$ in the formula of $\sin(\alpha)/\sin(\alpha')=n$. Likewise, the second incident angle $\beta'$ may be set by substituting the relative refractive index n and the second incident angle $\beta'$ in the formula of $\sin(\beta)/\sin(\beta')=n$. In the setting of the first refractive angle $\alpha'$ and the second incident angle $\beta'$, the refractive index of the material interposed between the second transparent layer 35 and the atmospheric air (for example, the second transparent plate 22 illustrated in FIG. 1) may be neglected. Even when the second transparent plate 22 is present, the first refractive angle $\alpha'$ and the second incident angle $\beta'$ may be found according to the formula of Snell's law on assumption that the second transparent layer 35 is in contact with the atmospheric air. The found value does not vary according to the presence and absence of the second transparent plate 2.

When the front surface 20a of the transparent screen 20 is directed to left in section perpendicular of the y direction as illustrated in FIG. 3, the first incident angle $\alpha$, the first refractive angle $\alpha'$, the second incident angle $\beta'$, the second refractive angle $\beta$ and the slant angle θ2 are defined as having a plus value in a clockwise direction and a minus value in an counterclockwise direction, respectively. The first incident angle $\alpha$, the first refractive angle $\alpha'$, the second incident angle β', the second refractive angle β and the slant angle θ2 are greater than −90° and smaller than 90°. When a slant surface 45 has a slant angle θ2 of 0°, it is meant that this slant surface is parallel to the reference surface 41. In FIG. 3, the first incident angle α, the first refractive angle α' and the slant angle θ2 are represented by "−α", "−α'" and "−θ2" because these angles are negative.

The slant angle θ2 of each of the slant surfaces 45 may be set based on a positional relationship among the projector 12, the observer 13 and the transparent screen 20, the refractive index of the transparent screen 20 and another factor. The reason why the refractive index of the transparent screen 20 is taken into consideration is that the incident light IL or reflection light RL is refracted at the boundary between the transparent screen 20 and the atmospheric air. The slant angle θ2 of each of the slant surfaces 45 may be set such that when the observer 13 observes a video at a preset position, no hot spot is not observed by the observer, and such that the video is wholly brightly observed. In the case of a slant reflective surface 45 and a slant surface 42 that are present at the same position in the z direction, the slant angle θ2 of this slant reflective surface 45 and the slant angle θ1 of this slant surface 42 have substantially the same value.

Each of the slant reflective surface 45 has a slant angle θ2 of, for example, −42° to 42°, preferably −30° to 30°, more preferably −25° to 25°. In a case where the transparent screen 20 is applied to, for example, the windshield of an automobile to be utilized in a tilted position to an observer 13; (1) when the projector 12 is a long focus projector, it is sufficient that each of the slant reflective surfaces 45 has a slant angle θ2 of −24° to 18°, and each of the slant surfaces 42 has a slant angle θ1 of preferably −20° to 15°, more preferably −16° to 12°; and (2) when the projector 12 is a short focus projector, it is sufficient that each of the slant reflective surfaces 45 has a slant angle θ2 of −27° to 30°, and each of the slant reflective surfaces 45 has a slant angle θ2 of preferably −23° to 25°, more preferably −18° to 19°. On the other hand, in a case where the transparent screen 20 is applied to, for example, a windowpane of a railcar or a building, a partition in a room or a display screen of a refrigerator so as to be placed parallel to an observer 13, it is sufficient that each of the slant reflective surfaces 45 has a slant angle θ2 of 4° to 32°, and each of the slant reflective surfaces 45 has a slant angle θ2 of preferably 5° to 28°, more preferably 6° to 24°.

As illustrated in FIG. 3, the respective slant reflective surfaces 45 in at least part of the video projection area may be formed such that the formula of θ2=(α'+β')/2 is established in section perpendicular to the y direction. Since each of the slant reflective surfaces 45 has a concavo-convex in a fine fashion, light reflected by each of the slant reflective surfaces 45 is scattered. When the slant reflective surfaces 45 are formed such that the formula of θ2=(α'+β')/2 is established, the most intensive light among the light scattered and reflected by each of the slant reflective surfaces can be directed toward the observer 13. The most intensive light among the light scattered and reflected by each of the slant reflective surfaces 45 at different positions in the z direction can be directed toward the observer 13. Thus, the difference between the brightness in a central portion of a video and the brightness in a peripheral portion of the video can be reduced to provide a direction where the video can be wholly observed brightly.

The slant reflective surfaces 45 may be formed such that the slant angles θ2 measured for the respective slant reflective surfaces 45 stepwise or sequentially decreasing from one end in the z direction (for example, a lower end) toward the other end in the z direction (for example, an upper end) in section perpendicular to the y direction in at least part of a video projection area where a video is projected. For example, the uppermost slant reflective surface 45 in FIG. 1 may have a slant angle θ2 (having a negative value) set so as to be smaller than the slant angle θ2 (having a negative value) of the lowermost slant reflective surface 45 in FIG. 1. The most intensive light among the light scattered and reflected by each of the slant reflective surfaces 45 at different positions in the z direction can be directed toward the observer 13. Thus, the difference between the brightness in a central portion of a video and the brightness in a peripheral portion of the video can be reduced to provide a direction where the video can be wholly observed brightly. The slant angles θ2 of the slant reflective surfaces 45 may vary only in a negative range, only in a positive range, or in both of positive and negative ranges.

The slant reflective surfaces 45 have a pitch P2 of, for example, at least 15 μm, preferably at least 20 μm. When the pitch P2 is at least 15 μm, the emission angle of diffracted light having the most intense power among the diffracted light described later can be decreased to minimize a case where multiple images in a video are recognized as a ghost. The pitch P2 is at most 300 μm. When the pitch P2 is at most 300 μm, the stripe of the slant reflective surfaces 45 is too narrow to be visible to an observer 13. In the case of a slant reflective surface 45 and a slant surface 42 that are present at the same position in the z direction, the pitch P2 of the slant reflective surface 45 in the z direction and the pitch P1 of the slant surface 42 in the z direction have substantially the same value.

As illustrated in FIG. 2, between adjacent slant reflective surfaces 45 may be formed a step surface 46 to connect the adjacent slant reflective surfaces 45. Although step surfaces 46 are shown to be perpendicular to the reference surface 41 in FIG. 2 (the concavo-convex is neglected), the step surfaces 46 may be slant to the reference surface 41. It should be noted that a parallel surface parallel to the reference surface 41, in addition to such a step surface 46, may be formed between adjacent slant reflective surfaces 45.

The slant reflective surfaces 45 have the concavo-convex and are configured to have convex portions 45a and concave portions 45b alternately arranged in section perpendicular to the y direction. Although the concavo-convex of the slant reflective surfaces 45 is either a regular one or an irregular one, the concavo-convex is preferably an irregular one.

A slant reflective surface 45 has a surface roughness Ra set to be sufficiently shorter than the length L2 of the slant reflective surface 45 in its slant direction (L2=|P2/cos(θ2)|). The surface roughness Ra is, for example, 0.01 μm to 10 μm. The surface roughness Ra of the slant reflective surfaces 45 is measured in the y direction. The surface roughness Ra of the slant reflective surfaces 45 is measured in the y direction, not in the z direction, in order to prevent noise that is produced when the first transparent layer 32 is formed in a saw tooth shape in section perpendicular to the y direction.

Between a case where light transmitted through the transparent screen 20 from the rear side to the front side (hereinbelow, referred to as "background transmission light") is positioned at a slant reflective surface 45 in the z direction and a case where the background transmission light is positioned at a step surface 46 in the z direction, both cases have different distances where the background transmission light passes. In other words, when the transmission position is different in the z direction, the background transmission light has different transmittances. Specifically, in a case where the background transmission light passes through a step surface 46, the distance where the background transmission light passes through the reflective layer 34 is longer and has a lower transmittance in comparison with a case where the background transmission light passes through a slant reflective surface 45.

From this point of view, in order to prevent the transmittance of the background transmitted light from cyclically changing in the z direction to minimize the diffraction of the background transmitted light, the slant surfaces 42 may be formed to have slant angles θ1 set at dispersed values, respectively. Based on such a structure, the diffraction of the background transmitted light can be minimized to reduce a case where a background is visible in multiple images.

Figure 4:
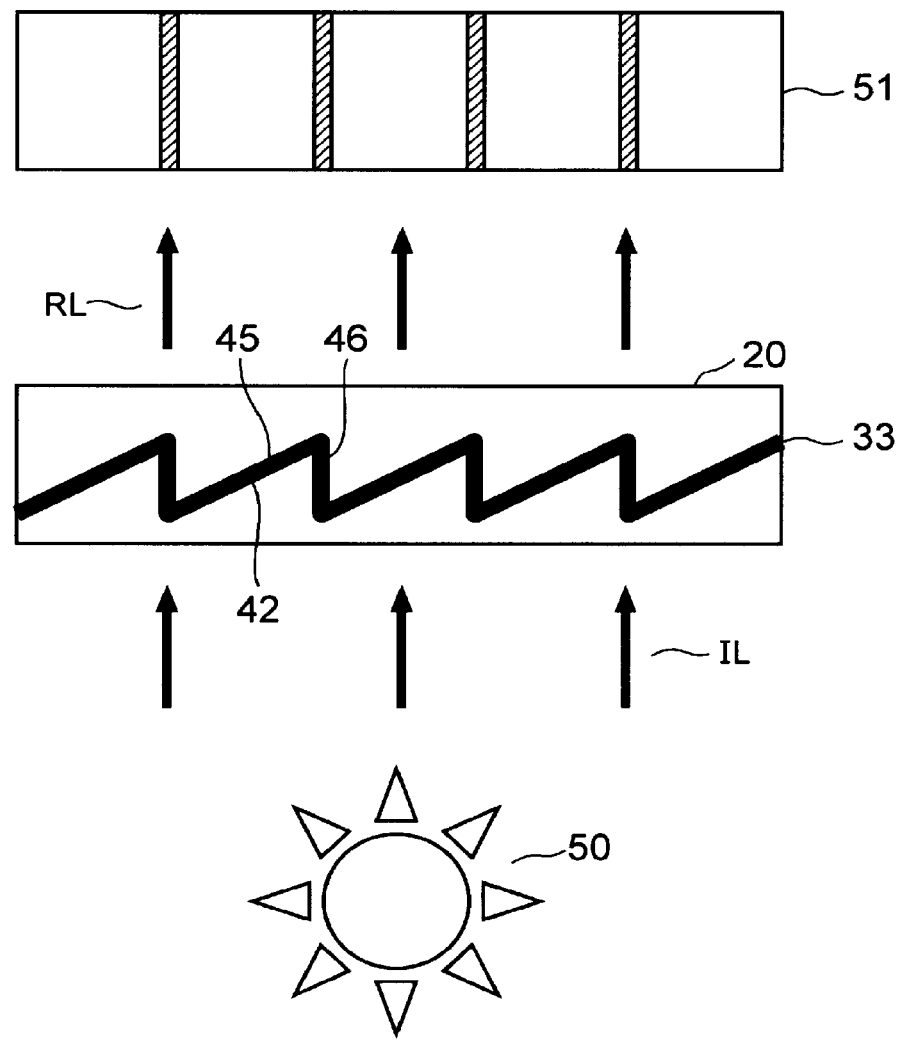
FIG. 4 is a schematic view illustrating that the transmittance of background transmitted light varies according to positions where the background transmitted light is transmitted through the transparent screen.
Figure 5:
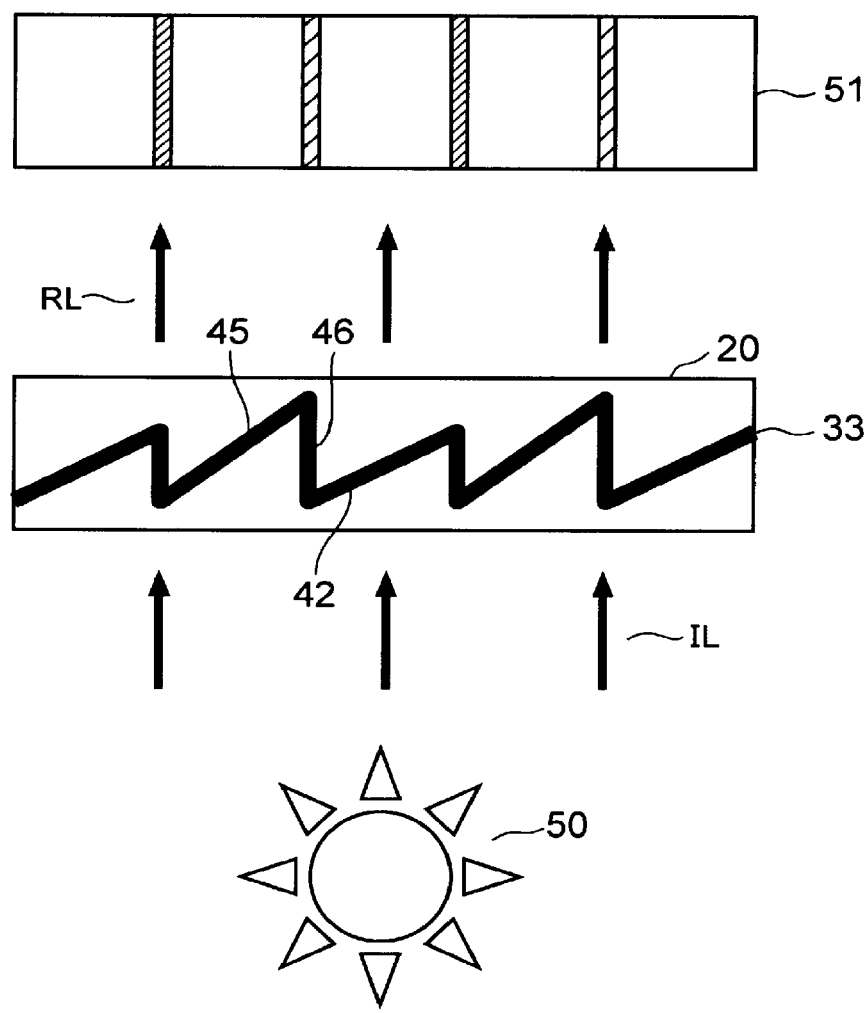
FIG. 5 is a schematic view illustrating that the transmittance of background transmitted light varies according to positions where the background transmitted light is transmitted through the transparent screen.

FIGS. 4 and 5 are schematic views illustrating that the transmittance of the background transmitted light varies according to positions where the background transmitted light transmits the transparent screen 20. FIG. 4 is one where the slant angles θ1 of the slant surfaces 42 are the same value. FIG. 5 is one where the slant angles θ1 of the slant surfaces 42 are dispersed.

FIGS. 4 and 5 schematically illustrate a light source 50 and the transparent screen 20. FIGS. 4 and 5 also illustrate the intense distribution 51 of the background transmitted light when light is incident from the light source 50 on the transparent screen 20.

In the examples illustrated in FIGS. 4 and 5, it is assumed that all of the slant surfaces 42 have the same pitch P1 in the z direction. In other words, the step surfaces 46 have a constant cycle in the z direction. Although the cycle is constant in the Experimental Examples, it is not essential that the cycle be constant.

When light from the light source 50 is incident on the transparent screen 20 as illustrated in FIG. 4, the background transmitted light that has been transmitted through the concavo-convex layer 33 at the step surfaces 46 has the same intensity. The background transmitted light that has been transmitted through the respective slant reflective surface 45 has the same intensity. For this reason, a part having the same intensity cyclically appears in the intensity distribution 51 of the background transmitted light. It results in an increase in the diffraction of the background transmitted light to lower the visibility of an observer 13. Specifically, the background becomes visible in multiple images.

In the example illustrated in FIG. 5, the slant angles θ1 of the slant surfaces 42 are not constant. For this reason, when light from the light source 50 is incident on the transparent screen 20, the background transmitted light that has been transmitted through the concavo-convex layer 33 at the step surfaces 46 has dispersed intensities. The reason is that the concavo-convex layer 33 has dispersed absorption amounts of light because the step surfaces 46 have ununiform lengths in the x direction due to unevenness in the slant angles θ1 of the slant surfaces 42. Further, the background transmitted light that has been transmitted through the respective slant reflective surfaces 45 has also dispersed intensities due to unevenness in the slant angles θ1 of the slant surfaces 42. This is because a slant surface 42 having a great slant angle θ1 has a longer passing distance of light than a slant surface 42 having a small slant angle θ1. As a result, the diffraction of the background transmitted light can be minimized to reduce a case where a background is visible in multiple images.

In this embodiment, the slant surfaces 42 of the concavo-convex layers 33 in the transparent screen 20 have dispersed slant angles θ1 as illustrated in FIG. 5 not to prevent the intensity distribution of the background transmitted light from being cyclic to reduce a case where a background is visible in multiple images.

Now, explanation will be made about the relationship between the irregularity (randomness) in the slant angles θ1 of the slant surfaces 42 and the diffraction of background transmitted light in reference to FIGS. 6 to 14. In the following Experimental Examples 1 to 9, simulation was made to find the relationship between an incident angle and the intensity of background transmitted light that was incident perpendicularly on the rear side of a transparent screen 20 and emits from the front side of the transparent screen 20. In the simulation, scalar diffraction calculation was used.

In this embodiment, the wording "random" means that the slant angles θ1 of the slant surfaces 42 do not follow a fixed pattern (regular pattern), and that it is impossible to predict the values of the respective slant angles θ1. The slant angles θ1 of the respective slant surfaces 42 change randomly. Nevertheless, the wording "change randomly" (having random variations) means to irregularly change in the z direction (the difference between the slant angle θ1 of a slant surface 42 and the slant angle θ1 of its adjacent slant surface 42 in the z direction is not uniform), not to evenly change toward an increasing direction or decreasing direction of the angles in the z direction. In this embodiment, the distribution of the intensity of diffracted light to diffraction angles is called diffraction efficiency.

In each of FIGS. 6 to 14, the horizontal axis represents diffraction angles, and the vertical axis represents intensities of diffracted light. The diffraction angles represent the inclination of emission light to incident light. In other words, a diffraction angle is equal to its corresponding reflection angle. The diffraction angles were defined as being positive in a clockwise direction and as being negative in a counterclockwise direction. In each of Experimental Examples 1 to 9, the slant surfaces 42 had a pitch P1 set at 40 μm in the z direction. In Experimental Examples 1 to 9, the slant angles θ1 were provided with randomness with respect to all of the slant surfaces 42.

The conditions and the visibility in Experimental Examples 1 to 9 are shown in Table 1.

TABLE 1

| Experimental Ex. | Central Angle (θ) | Change Rate (variation) | PV1/P1 | Visibility |
|---|---|---|---|---|
| 1 | 5° | ±0% (0°) | 0.087 | X |
| 2 | 5° | ±20% (1°) | 0.087 | Δ |
| 3 | 5° | ±50% (2.5°) | 0.087 | Δ |
| 4 | 5° | ±100% (5°) | 0.087 | Δ |
| 5 | 30° | ±0% (0°) | 0.57 | X |
| 6 | 30° | ±10% (3°) | 0.57 | Δ |
| 7 | 30° | ±20% (6°) | 0.57 | ○ |
| 8 | 30° | ±30% (9°) | 0.57 | ○ |
| 9 | 30° | ±50% (15°) | 0.57 | ◎ |

In each of Experimental Examples 1 to 4, the central angle was set to 5°. In each of Experimental Examples 5 to 9, the central angle was set to 30°. The central angle is a reference angle when the slant angles θ1 of the slant surfaces 42 were dispersed. This means that the central angle corresponds to the average angle of the slant angles θ1 of the slant surfaces 42.

In Table 1, A symbol of "◎" represents that no multiple images were observed, and that a video was obtained in a good visibility. A symbol of "○" represents that although a video was obtained in a good visibility, multiple images were slightly observed. A symbol of "Δ" represents that although multiple images were reduced, a video was not obtained in a good visibility, A symbol of "x" represents that many multiple images were observed, and a video was not obtained in a good visibility.

Figure 6:
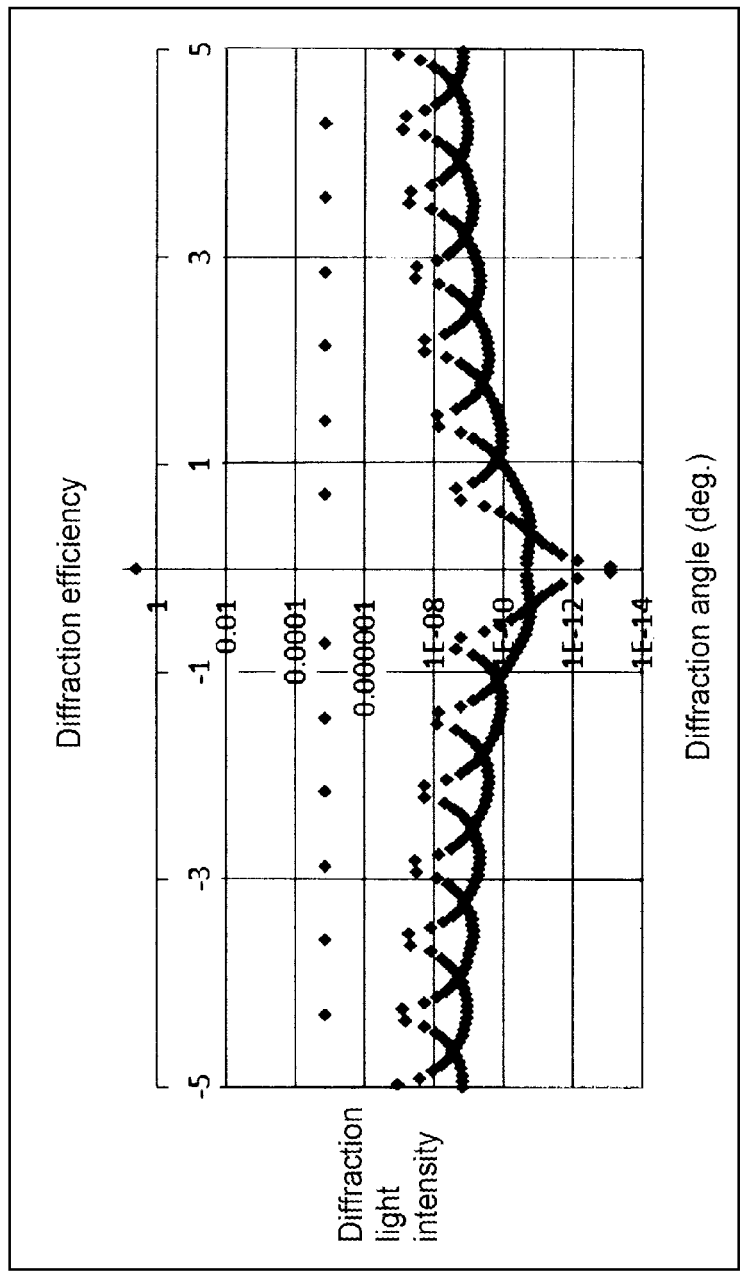
FIG. 6 is a graph illustrating the diffraction efficiency of Experimental Example 1.

In FIG. 6 is illustrated the diffraction efficiency of Experimental Example 1. In Experimental Example 1, the slant angles θ1 of all of the slant surfaces 42 were set to the same value, specifically 5°. In other words, Experimental Example 1 is an example of cases where the slant angles θ1 of all of the slant surfaces 42 were not dispersed. In Experimental Example 1, no good result (good visibility) was obtained.

Specifically, high diffraction light intensities appeared at every about 0.7° as illustrated in FIG. 6. This causes a phenomenon where a background is visible in a multiple fashion to an observer 13.

Figure 7:
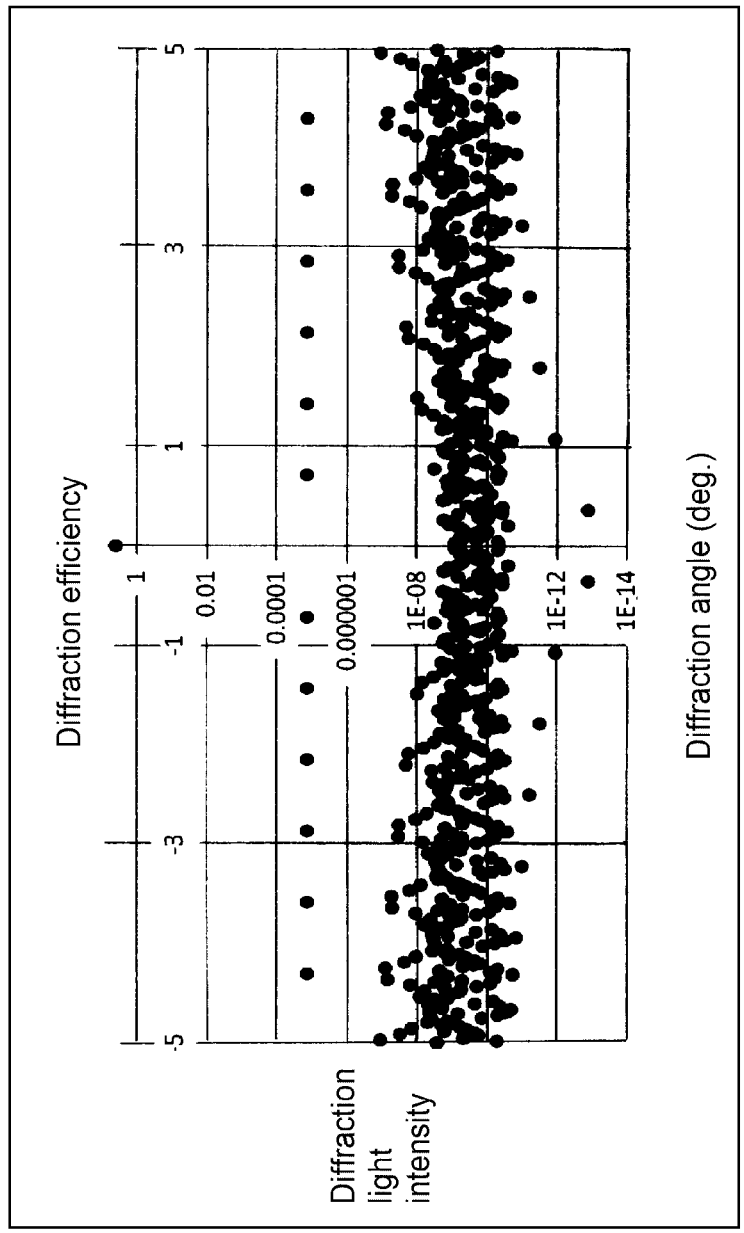
FIG. 7 is a graph illustrating the diffraction efficiency of Experimental Example 2.

In FIG. 7 is illustrated the diffraction efficiency of Experimental Example 2. In Experimental Example 2, the change rate to the central angle of 5° was set to ±20%. In other words, under a condition where the average angle of the slant angles θ1 of all of the slant surfaces 42 was 5°, the slant angles θ1 of all of the slant surfaces 42 were set such that the existence possibilities were uniform but the slant angles were randomly dispersed within a range of 6° to 4°. In Experimental Example 2, although multiple videos were reduced, no good visibility was obtained. As illustrated in FIG. 7, high diffraction light intensities appear at every about 0.7° in Experimental Example 2 as well, though the diffraction light intensities have a lower level than those in Experimental Example 1.

Figure 8:
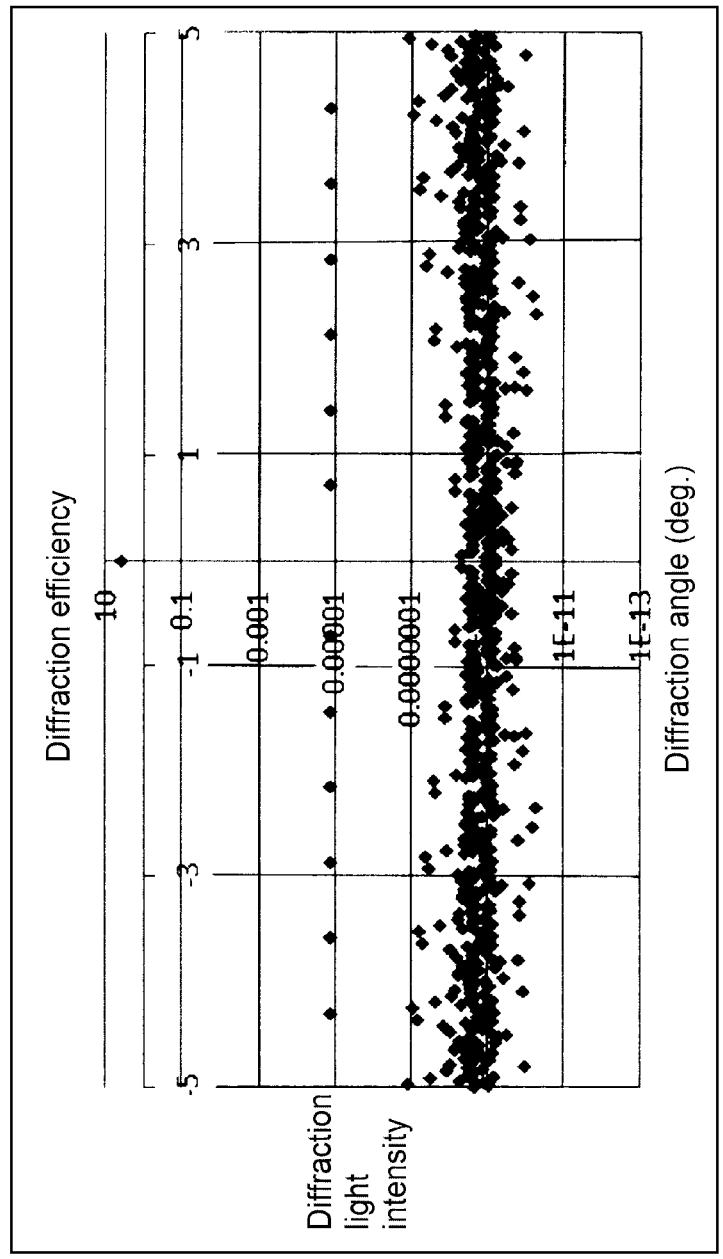
FIG. 8 is a graph illustrating the diffraction efficiency of Experimental Example 3.

In FIG. 8 is illustrated the diffraction efficiency of Experimental Example 3. In Experimental Example 3, the change rate to the central angle of 5° was set to ±50%. In other words, under a condition where the average angle of the slant angles θ1 of all of the slant surfaces 42 was 5°, slant angles θ1 of all of the slant surfaces 42 were set such that the existence possibilities were uniform but the slant angles were randomly dispersed within a range of 7.5° to 2.5°. In Experimental Example 3, although multiple videos were reduced, no good visibility was obtained.

As illustrated in FIG. 8, high diffraction light intensities appear at every about 0.7° in Experimental Example 3, though the diffraction light intensities have a lower level than those in Experimental Examples 1 and 2.

Figure 9:
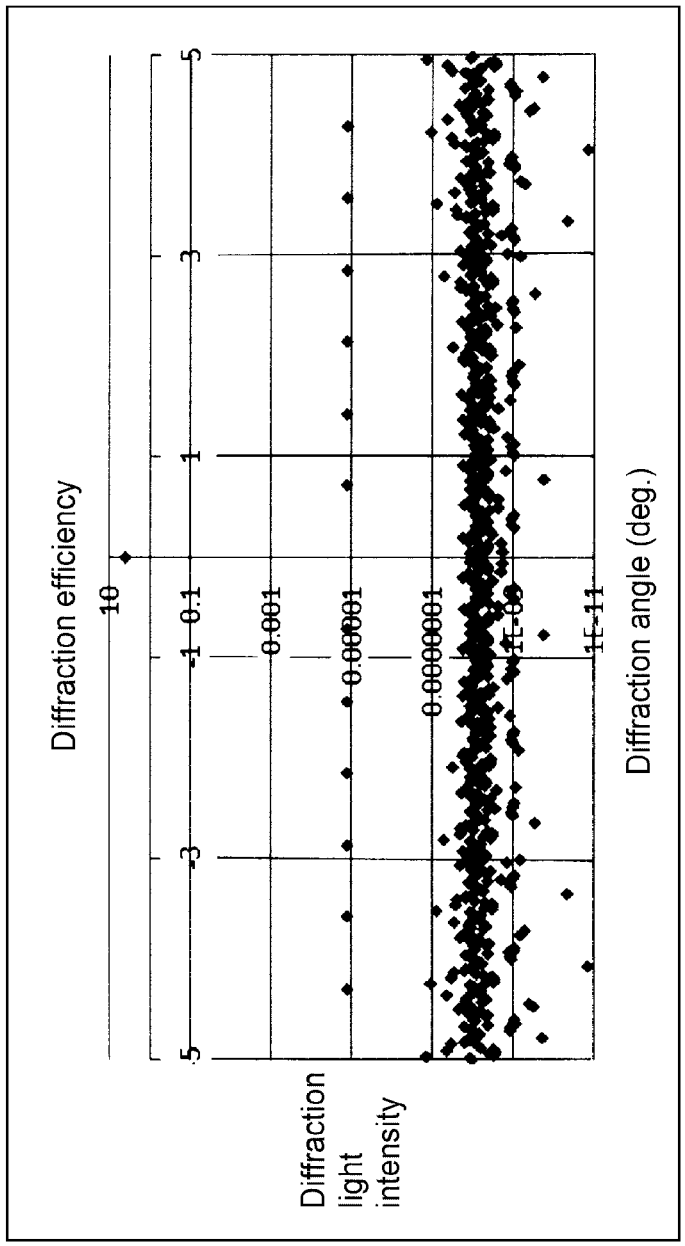
FIG. 9 is a graph illustrating the diffraction efficiency of Experimental Example 4.

In FIG. 9 is illustrated the diffraction efficiency of Experimental Example 4. In Experimental Example 4, the change rate to the central angle of 5° was set to ±100%. In other words, under a condition where the average angle of the slant angles θ1 of all of the slant surfaces 42 was 5°, the slant angles θ1 of all of the slant surfaces 42 were set such that the existence possibilities were uniform but the slant angles were randomly dispersed within a range of 10° to 0°. In Experimental Example 4, although multiple videos were reduced, no good visibility was obtained.

As illustrated in FIG. 9, high diffraction light intensities appear at every about 0.7° in Experimental Example 4 as well, though the diffraction light intensities have a lower level than those in Experimental Examples 1 to 3.

Figure 10:
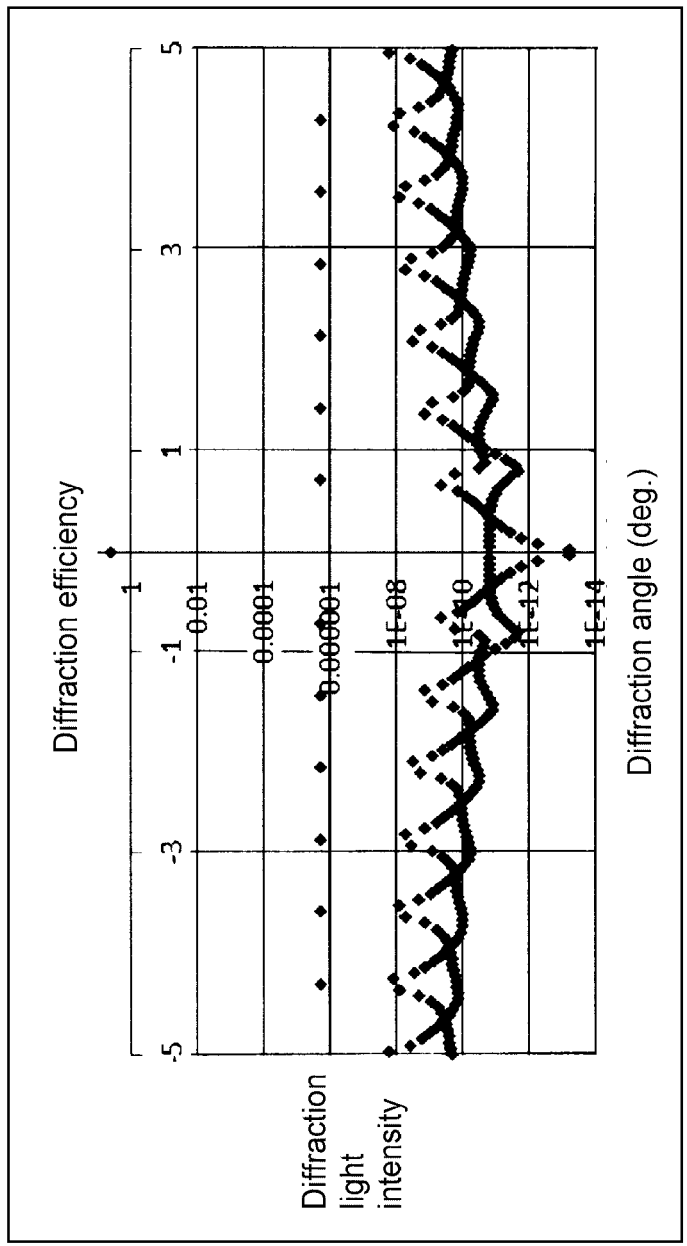
FIG. 10 is a graph illustrating the diffraction efficiency of Experimental Example 5.

In FIG. 10 is illustrated the diffraction efficiency of Experimental Example 5. In Experimental Example 5, the slant angles θ1 of all of the slant surfaces 42 were set to the same value, specifically 30°. In other words, Experimental Example 5 is an example of cases where the slant angles θ1 of all of the slant surfaces 42 were not dispersed. In Experimental Example 5, no good visibility was obtained as in Experimental Example 1.

In Experimental Example 5, high diffraction light intensities appeared at every about 0.7° as illustrated in FIG. 10. This causes a phenomenon where a background is visible in a multiple fashion to the observer 13.

Figure 11:
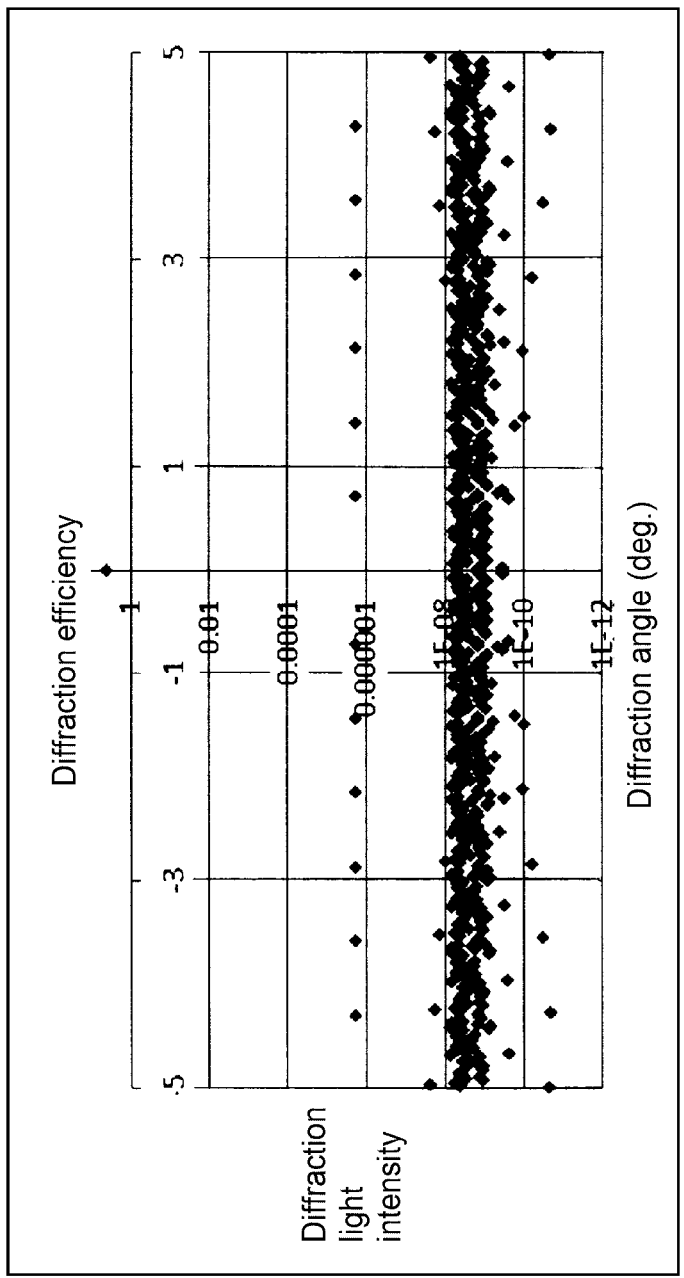
FIG. 11 is a graph illustrating the diffraction efficiency of Experimental Example 6.

In FIG. 11 is illustrated the diffraction efficiency of Experimental Example 6. In Experimental Example 6, the change rate to the central angle of 30° was set to ±10%. In other words, under a condition where the average angle of the slant angles θ1 of all of the slant surfaces 42 was 30°, the slant angles θ1 of all of the slant surfaces 42 were set such that the existence possibilities were uniform but the slant angles were randomly dispersed within a range of 33° to 27°. In Experimental Example 6, no good visibility was obtained.

As illustrated in FIG. 11, high diffraction light intensities appear at every about 0.7° in Experimental Example 6 as well, though the diffraction light intensities have a lower level than those in Experimental Example 5.

Figure 12:
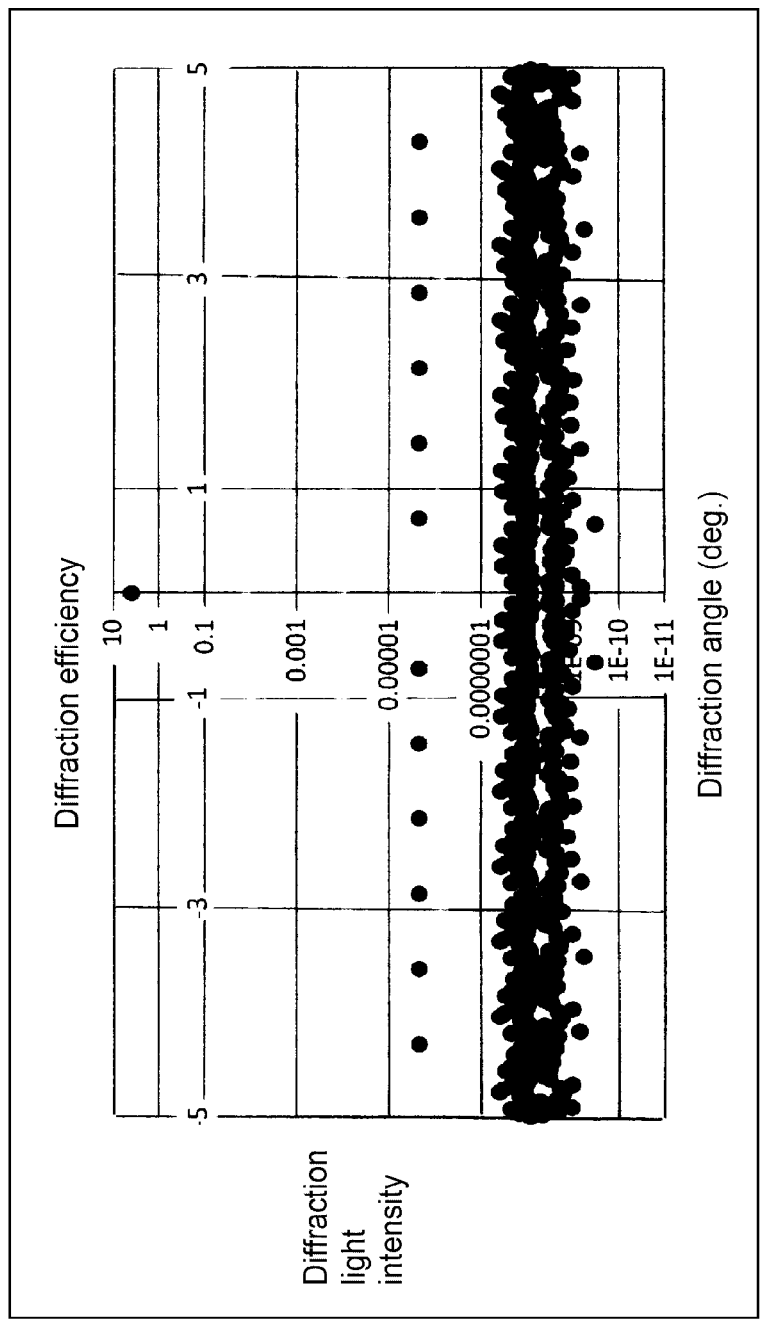
FIG. 12 is a graph illustrating the diffraction efficiency of Experimental Example 7.

In FIG. 12 is illustrated the diffraction efficiency of Experimental Example 7. In Experimental Example 7, the change rate to the central angle of 30° was set to ±20%. In other words, under a condition where the average angle of the slant angles θ1 of all of the slant surfaces 42 was 30°, the slant angles θ1 of all of the slant surfaces 42 were set such that the existence possibilities were uniform but the slant angles were randomly dispersed within a range of 36° to 24°. In Experimental Example 7, a video having good visibility was obtained, though multiple images were slightly observed.

As illustrated in FIG. 12, the difference between a relatively high diffraction light intensity and a relatively low diffraction light intensity becomes smaller in Experimental Example 7 as well in comparison with Experimental Examples 5 and 6. For this reason, relatively less-intense diffraction light interposes between relatively intense diffraction light and relatively intense diffraction light subsequent thereto with the result that a video is difficult to be observed as multiple images, and that visibility is improved.

Figure 13:
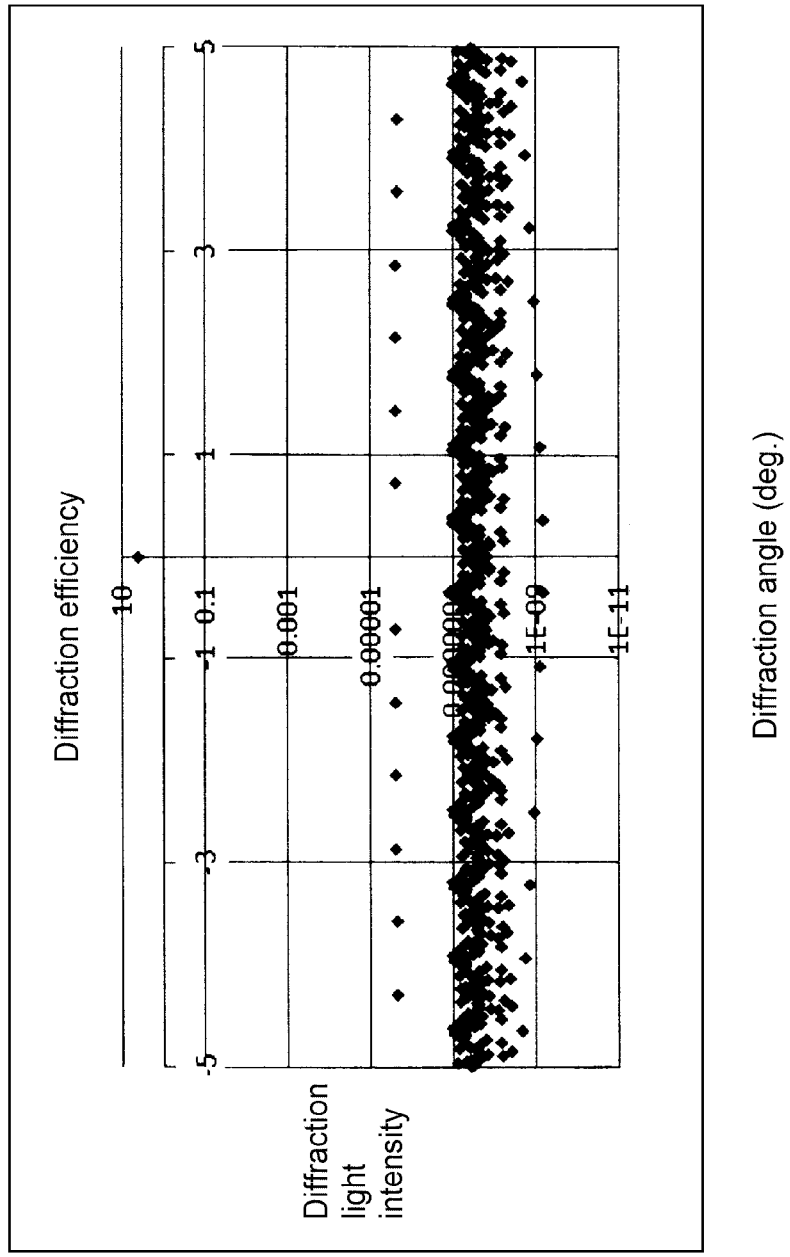
FIG. 13 is a graph illustrating the diffraction efficiency of Experimental Example 8.

In FIG. 13 is illustrated the diffraction efficiency of Experimental Example 8. In Experimental Example 8, the change rate to the central angle of 30° was set to ±30%. In other words, under a condition where the average angle of the slant angles θ1 of all of the slant surfaces 42 was 30°, the slant angles θ1 of all of the slant surfaces 42 were set such that the existence possibilities were uniform but the slant angles were randomly dispersed within a range of 39° to 21°. In Experimental Example 8, a video having good visibility was obtained, though multiple images were slightly observed.

As illustrated in FIG. 13, the difference between a relatively high diffraction light intensity and a relatively low diffraction light intensity becomes smaller in Experimental Example 8 in comparison with Experimental Examples 5 to 7. For this reason, relatively less intense diffraction light interposes between relatively intense diffraction light and relatively intense diffraction light subsequent thereto with the result that a video is difficult to be observed as multiple images, and that visibility is improved.

Figure 14:
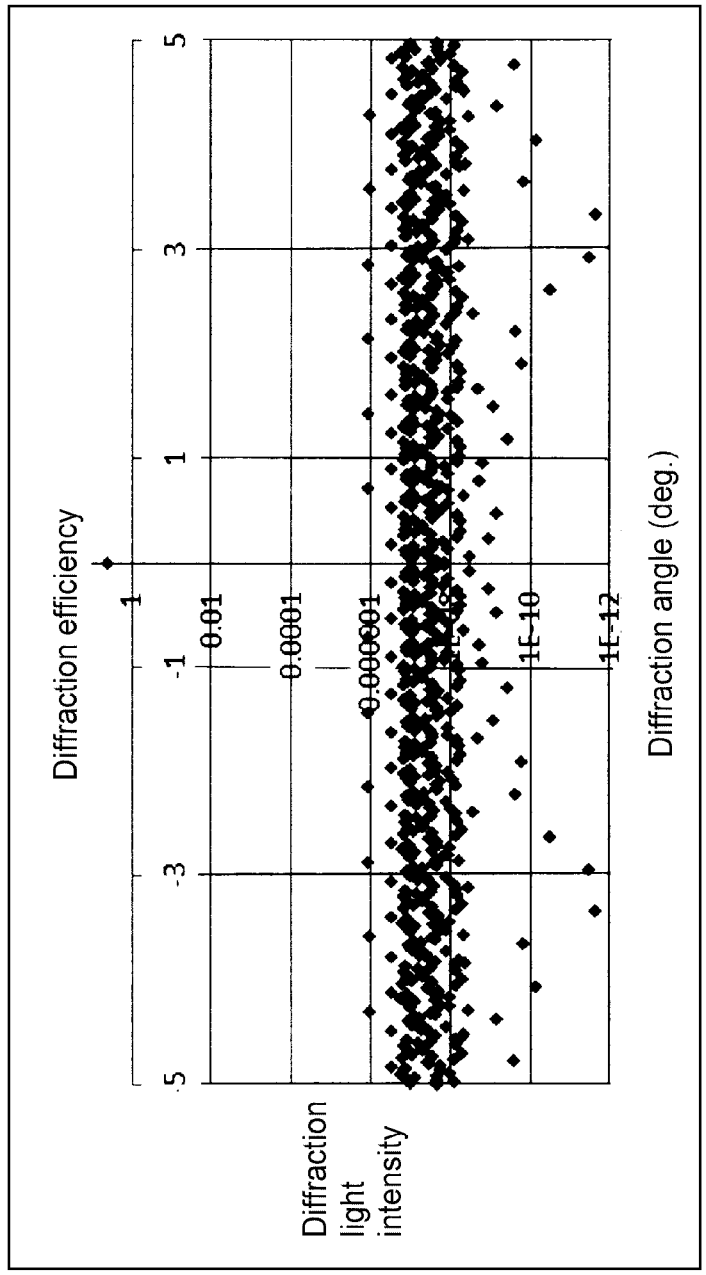
FIG. 14 is a graph illustrating the diffraction efficiency of Experimental Example 9.

In FIG. 14 is illustrated the diffraction efficiency of Experimental Example 9. In Experimental Example 9, the change rate to the central angle of 30° was set to ±50%. In other words, under a condition where the average angle of the slant angles θ1 of all of the slant surfaces 42 was 30°, the slant angles θ1 of all of the slant surfaces 42 were set such that the existence possibilities were uniform but the slant angles were randomly dispersed within a range of 45° to 15°. In Experimental Examples 9, no multiple images were observed, and a video having good visibility was obtained.

As illustrated in FIG. 14, the difference between a relatively high diffraction light intensity and a relatively low diffraction light intensity becomes smaller in Experimental Example 9 in comparison with Experimental Examples 5 to 8. For this reason, relatively less intense diffraction light interposes between relatively intense diffraction light and relatively intense diffraction light subsequent thereto with the result that a video is difficult to be observed as multiple images, and that visibility is improved.

A comparison of Experimental Examples 1 and 5 with the other Experimental Examples reveals that when the slant angles $\theta 1$ of the respective slant surfaces 42 randomly change, relatively high diffraction light intensities lower to tend to achieve improved visibility. Further, as clearly seen from Experimental Examples 1 to 9, when the change rate to the central angle increases, relatively high diffraction light intensities further lower to increase the degree of improvement in visibility. Specifically, when the variations to the central angle are set to at least 1°, preferably at least 2.5°, the effect to reduce multiple images is brought about. When the variations to the central angle is set to at least 6°, the diffraction is reduced to increase the degree of improvement in visibility.

Although the concavo-convex layer 33 in each of Experimental Examples 2 to 4 and 6 to 9 is formed such that the slant surfaces 42 where each of the slant angles $\theta 1$ has an angle (such as 45° or 15°) changing in a range of a certain rate (such as ±50%) to a certain central angle (such as 30°) are randomly disposed, the slant surfaces 42 may be randomly dispersed so as to have an arbitrary angle in a range (0 to a certain rate) to the central angle. In other words, the variations in the angles may be a successive value, not a discrete (stepwise) value (such as 45° or 15°).

In the above-mentioned explanation in reference to FIGS. 6 to 14, it is recited that the slant angles $\theta 1$ of the slant surfaces 42 are dispersed. However, in a slant reflective surface 45 and a slant surface 42 that are present at the same position in the z direction, the slant angle $\theta 2$ of this slant reflective surface 45 is substantially the same as the slant angle $\theta 1$ of this slant surface 42. Accordingly, when the slant angles $\theta 1$ of the slant surfaces 42 become dispersed, the slant angles $\theta 2$ of the slant reflective surfaces 45 also become dispersed.

Further, although the step surfaces 46 are set in parallel with the x direction in FIGS. 4 and 5, the slant angles of the step surfaces 46 may be modulated to decrease diffraction to reduce multiple images.

The reflective layer 34 according to this embodiment includes the slant reflective surfaces 45, which are slant to the reference surface 41 and reflect projected video light. Each of the slant reflective surfaces 45 is formed in a stripe shape as seen from a normal direction of the reference surface 41. Each of the slant reflective surfaces 45 has the convex-concave formation to display a video. Thus, the slant reflective surfaces 45 to display a video are slant to surfaces generating a hotspot (the front surface 11*a* or the rear surface 11*b*). A bright video is observed in the regular reflection direction of a slant reflective surface 45 while a hot spot is observed in a regular reflection direction of the front surface 11*a* and so on. Accordingly, it is possible to separate a direction where a hot spot is observed and a direction where a bright video is observed with the result that a position where a video is brightly observed without observing a hot spot (for example, the position of the observer 13 indicated by the solid lines in FIG. 1) is established.

(Disposition of Transparent Screen)

Figure 15:
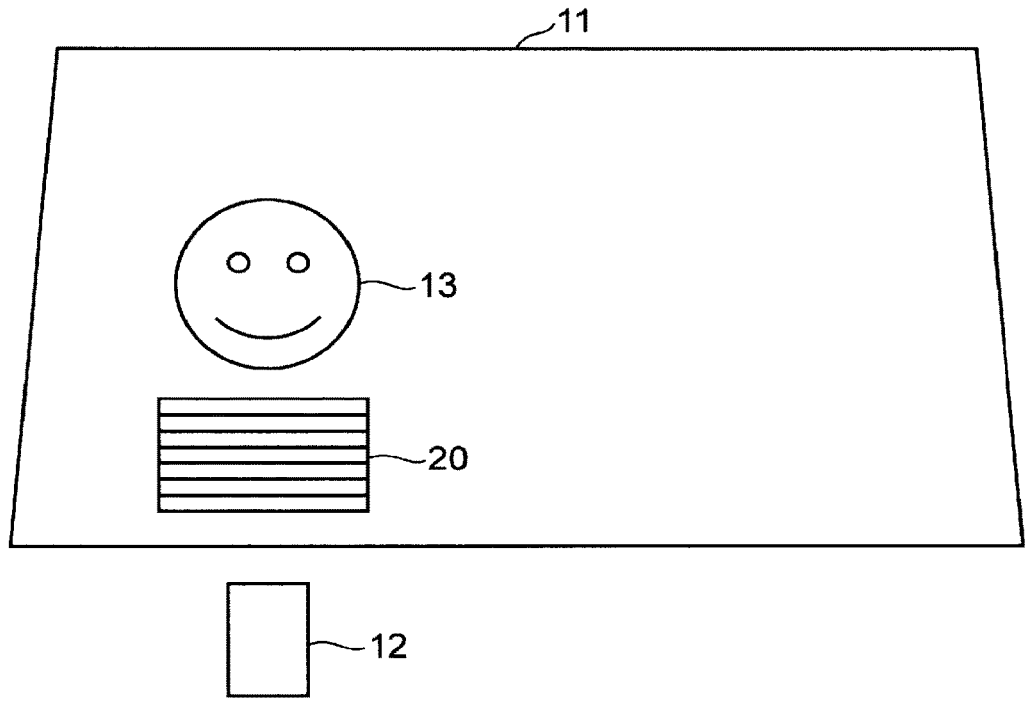
FIG. 15 is a schematic view illustrating an example of the positional relationship among the transparent screen of a laminated plate for video projection, a projector and an observer seen from a front side of a vehicle.

FIG. 15 is a view illustrating an example of the positional relationship among the transparent screen 20 of the laminated plate for video projection 11, the projector 12 and an observer 13 as seen from a front side of a vehicle when the laminated plate for video projection 11 is disposed on a front window of the vehicle (windshield). The laminated plate for video projection 11 is mounted to the front window of the vehicle. The transparent screen 20 is disposed on a lower portion of the window. The projector 12 is disposed under the window. The observer 13 has his or her eyes positioned at a level corresponding to a central portion of the window in a vertical direction. In this case, each of the slant reflective surfaces 45 may be formed in a transverse stripe shape elongated in a horizontal direction as illustrated in FIG. 15. The observer 13 can observe a bright video at a position where no hotspot is observed.

Figure 16:
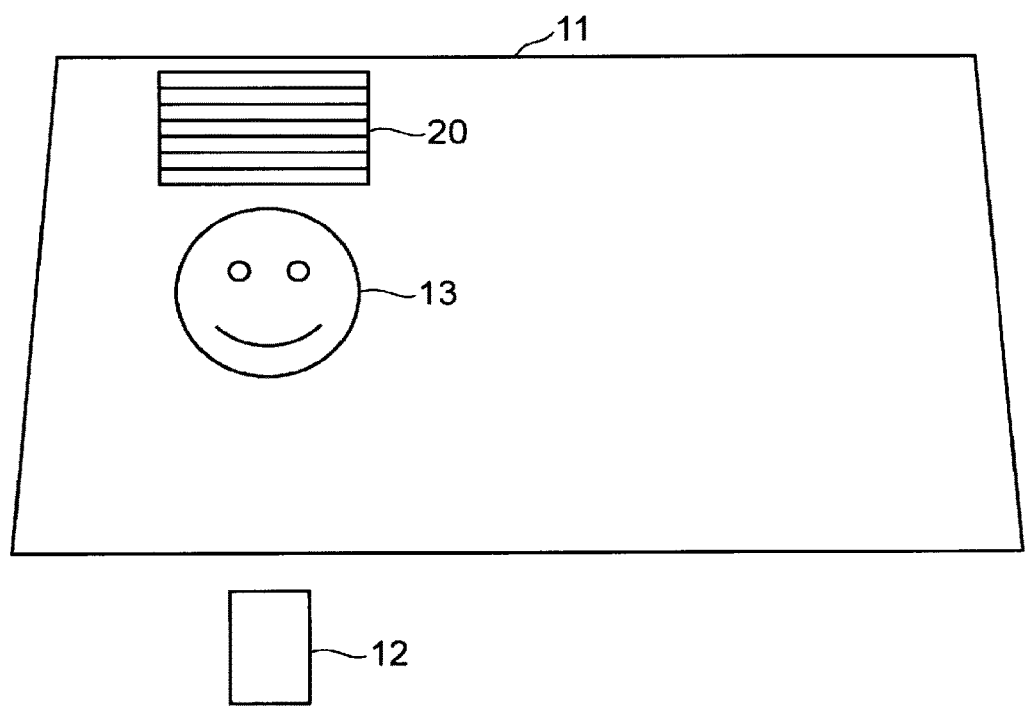
FIG. 16 is a schematic view illustrating another example of the positional relationship among the transparent screen of the laminated plate for video projection, the projector and the observer seen from a front side of a vehicle.

FIG. 16 is a view illustrating another example of the positional relationship among the transparent screen 20 of the laminated plate for video projection 11, the projector 12 and an observer 13 as seen from a front side of a vehicle. The laminated plate for video projection 11 is mounted to a front window of a vehicle. The transparent screen 20 is disposed on an upper portion of the window. The projector 12 is disposed under the window. The observer 13 has his or her eyes positioned at a level corresponding to a central portion of the window in the vertical direction. In this case as well, each of the slant reflective surfaces 45 may be formed in a transverse stripe shape elongated in the horizontal direction as illustrated in FIG. 16. The observer 13 can observe a bright video at a position where no hotspot is observed.

Figure 17:
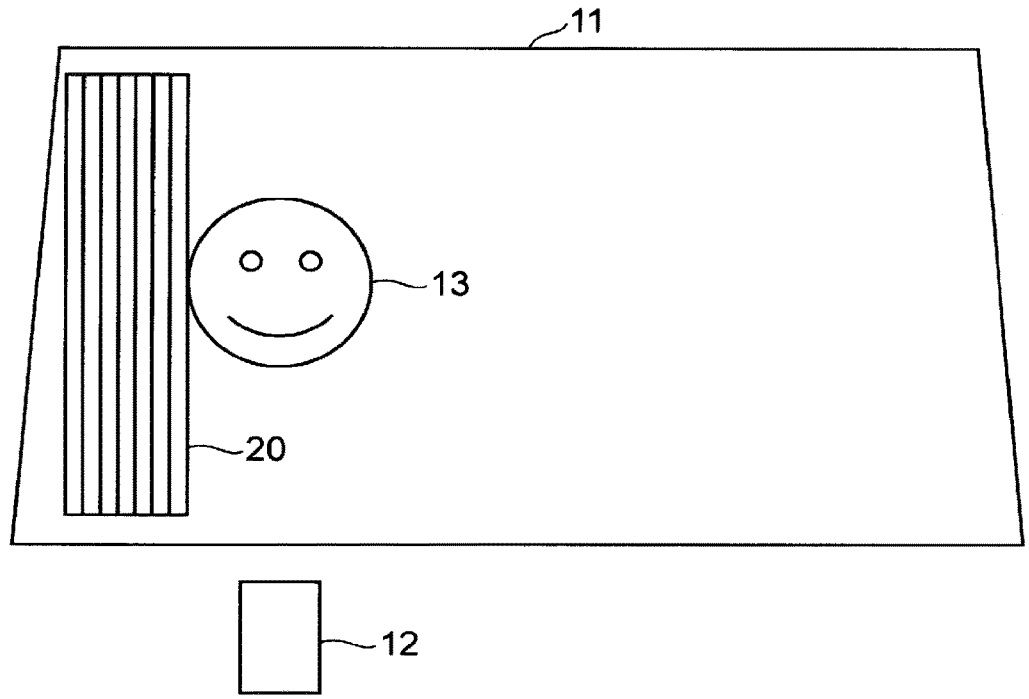
FIG. 17 is a schematic view illustrating still another example of the positional relationship among the transparent screen of the laminated plate for video projection, the projector and the observer seen from a front side of a vehicle.

FIG. 17 is a view illustrating the positional relationship among the transparent screen 20 of the laminated plate for video projection 11, the projector 12 and an observer 13 as seen from a frontside of a vehicle in still another example. The laminated plate for video projection 11 is mounted on a front window of the vehicle. The transparent screen 20 is disposed at one end of the window in its vehicle width direction. The projector 12 is disposed under the window. The observer 13 has his or her eyes positioned at a level corresponding to a central portion of the window in the vertical direction. In this case, each of the slant reflective surfaces 45 may be formed in a vertical stripe shape elongated in a vertical direction as illustrated in FIG. 17 or be formed in a horizontal stripe shape elongated in the horizontal direction. The observer 13 can observe a bright video at a position where no hotspot is observed.

In each of FIGS. 15 to 17, the projector 12 may be present at any position of the peripheral portion of the window and may be disposed at an upper position and so on. Further, a plurality of projectors 12 may be present. In each of FIGS. 15 to 17, the transparent screen 20 may be disposed at a central portion of the window. The window with the transparent screen 20 disposed may be, for example, a sidelite, a backlite, a roof window or the like, instead of a windshield. When the window with the transparent screen 20 disposed is a sidelite, the projector 12 may be disposed in an interior space, for example, at a position around the window frame of the sidelite (such as a position around a side door or a handrail). The transparent screen 20 may be equipped with a combiner for a HUD (head-up display) instead of a window. In general, the combiner is disposed between a windshield and a driver's seat. In these cases as well, there is an arrangement that allows the observer 13 to observe a bright video at a position where no hotspot is observed.

Each of the slant reflective surfaces 45 may be formed in a plurality of concentric stripe shape as in a Fresnel lens, seen from a normal direction of the reference surface 41, instead of being formed in a vertical stripe shape elongated in the vertical direction. In this mode, when the shape of a Fresnel lens is designed such that a video projected from the projector 12 gathers toward the observer 13, the Fresnel lens should be disposed to keep the concentric center out of the projection area.

(Process for Producing Transparent Screen)

Figure 18:
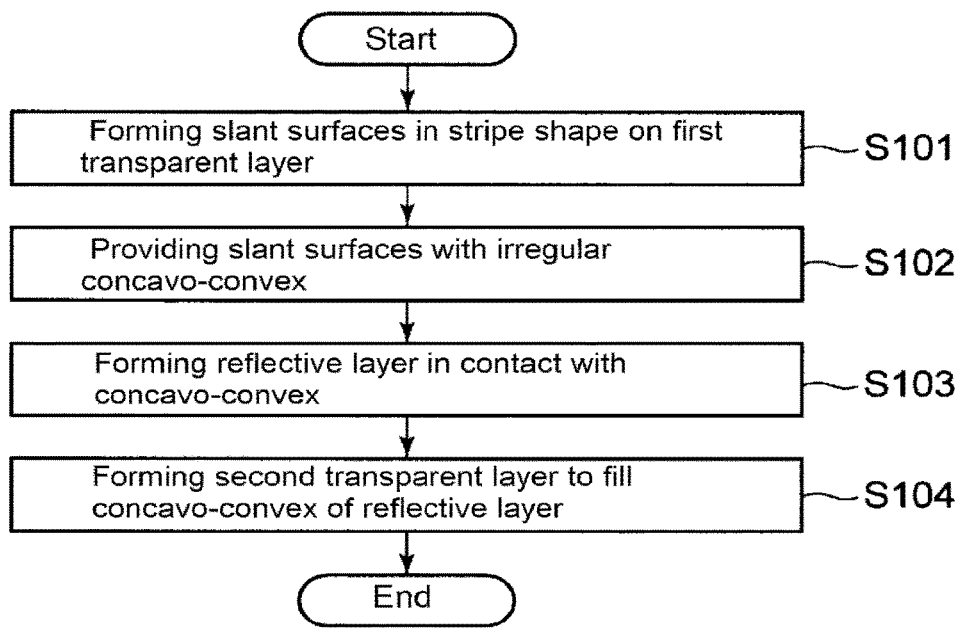
FIG. 18 is a flowchart illustrating the process for producing the transparent screen according to an embodiment of the present invention.

FIG. 18 is a flowchart illustrating the process for producing the transparent screen 20 according to an embodiment of the present invention. As illustrated in FIG. 18, the process for producing the transparent screen 20 includes a step S101 of forming a plurality of slant surfaces 42 in a stripe shape on a first transparent layer 32, a step S102 of providing a concavo-convex with each of the slant surfaces 42, a step S103 of forming a reflective layer 34 in contact with the concavo-convex, and a step S104 of forming a second transparent layer 35 so as to fill the concavo-convex of the reflective layer 34.

Figure 19:
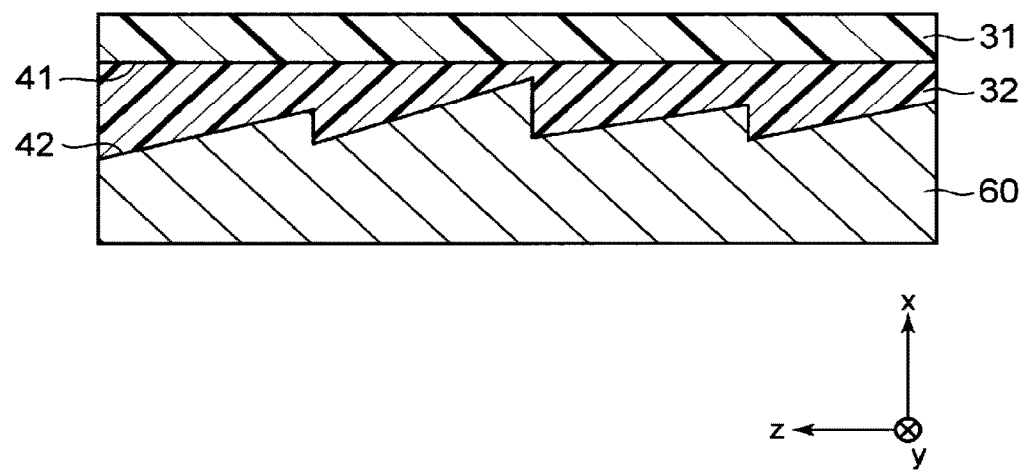
FIG. 19 is a schematic view illustrating an example of a step of forming a plurality of slant surfaces in a stripe shape on a first transparent layer.

FIG. 19 is a view illustrating an example of the step of forming the slant surfaces in a stripe shape on the first transparent layer. In step S101, the slant surfaces 42, which are slant to the reference surface 41, are formed, on a surface of the first transparent layer 32 opposite to the reference surface 41, in a stripe shape as seen from a normal direction of reference surface 41. As the formation method, a pressing process is, for example, applicable as illustrated in FIG. 19.

The pressing process is a process for transferring a convex-concave pattern of a mold 60 onto the first transparent layer 32. The pressing process includes an imprinting process. The imprinting process is a process where a resin material for the first transparent layer 32 is sandwiched between the mold 60 and the substrate sheet 31, the convex-concave pattern of the mold 60 is transferred onto the resin material, and the resin material is solidified.

In this embodiment, the solidifying includes curing. The method for solidifying may be properly selected according to the kind of the resin material. The resin material may be any one of a photocurable resin, a thermoplastic resin and a thermosetting resin. The photocurable resin is cured by irradiation of light. The thermoplastic resin is melted by heating and solidified by cooling. The thermosetting resin is changed in a liquid form into a solid form by heating. These resin materials may be applied, in a liquid state, to the substrate sheet 31 or the mold 60. There is no particular limitation to the application method. Spray coating, spin coating or gravure coating is, for example, applicable.

Cutting is also applicable, instead of the imprinting process. Cutting is a method for cutting the first transparent layer 32 by a cutting tool. The cutting tool may be a commonly used one.

Figure 20:
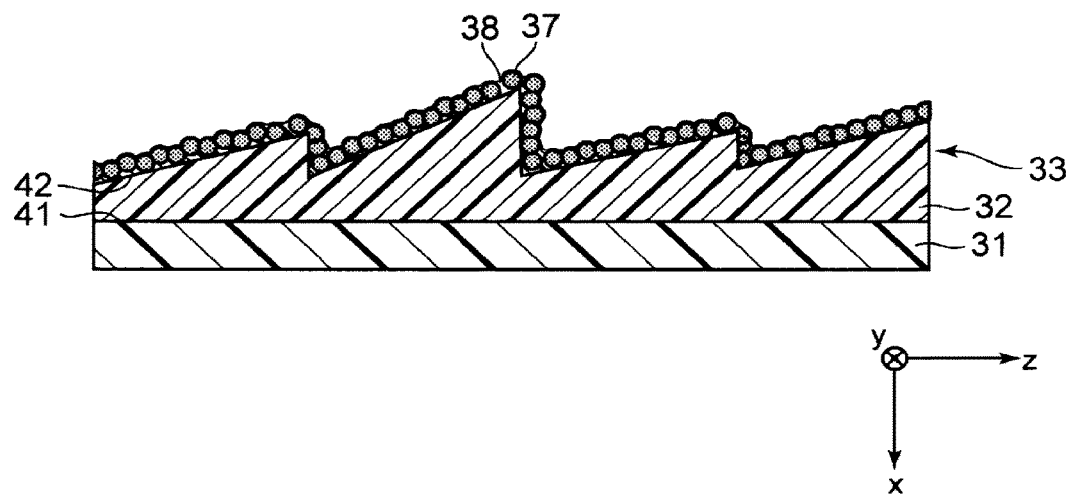
FIG. 20 is a schematic view illustrating an example of a step of providing a concavo-convex to each of the slant surfaces of the first transparent layer.

FIG. 20 is a view illustrating an example of the step of providing a convex-concave formation to the slant surfaces 42 of the first transparent layer 32 (step S102). As the method for providing the convex-concave formation to the slant surfaces 42, a deposition method, where a coating liquid is applied to the slant surfaces 42, and the applied film of the coating liquid is dried and solidified, is, for example, applicable. The coating liquid may include the particles 37 and the matrix 38 and further include a solvent for dissolving the matrix 38. The applied film of the coating liquid may be provided with an equal thickness to moderate the angles of the slant reflective surfaces 45. There is no particular limitation to the method for applying the coating liquid. Spray coating, spin coating or gravure coating is, for example, applicable.

Figure 21:
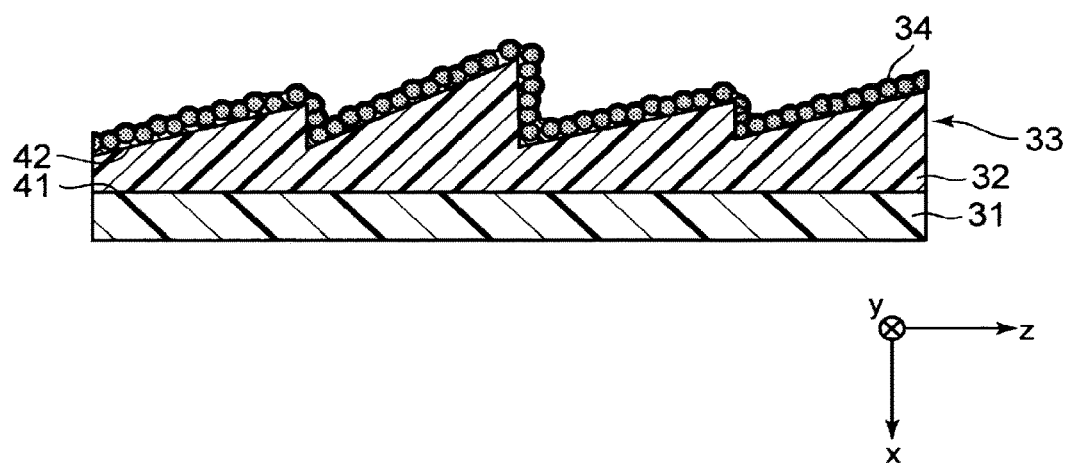
FIG. 21 is a schematic view illustrating an example of a step of forming a reflective layer.

FIG. 21 is a view illustrating an example of the step of forming the reflective layer 34 (step S103). As the method for forming the reflective layer 34, vacuum deposition or sputtering is, for example, applicable. The reflective layer 34 is formed along the convex-concave formation of the convex-concave layer 33.

Figure 22:
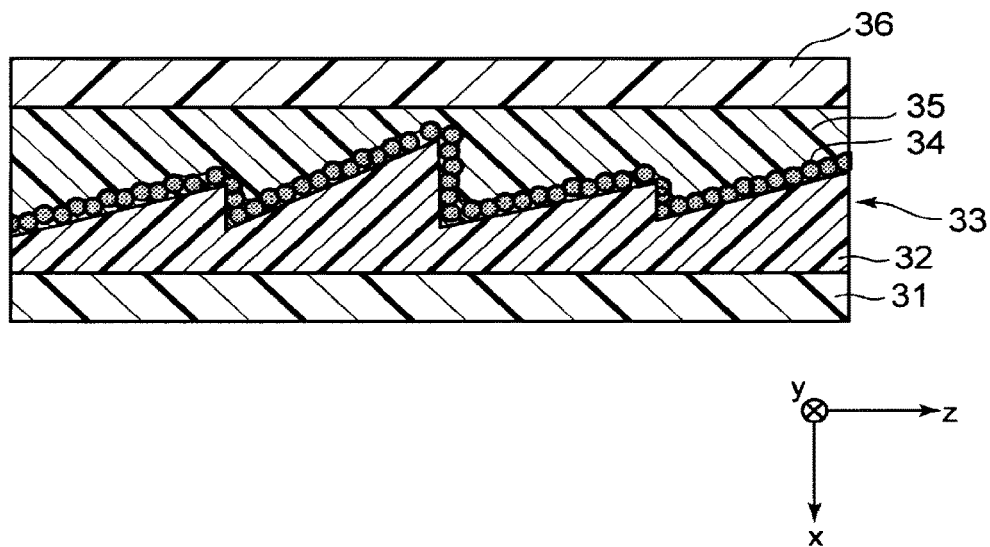
FIG. 22 is a schematic view illustrating an example of a step of forming a second transparent layer.

FIG. 22 is a view illustrating an example of the step of forming the second transparent layer 35 (step S104). The second transparent layer 35 is obtainable by sandwiching a resin material for the second transparent layer 35 between the reflective layer 34 and the protective sheet 36 and solidifying the resin material.

Although the transparent screen 20 according to this embodiment is configured to include the first transparent layer 32, the convex-concave layer 33, the reflective layer 34 and the second transparent layer 35 in this order from the rear side toward the front side as illustrating in FIGS. 1 and 2, the order may be reversed. In other words, the transparent screen 20 may be configured to include the second transparent layer 35, the reflective layer 34, the convex-concave layer 33 and the first transparent layer 32 in this order from the rear side toward the front side. The reflective layer 34 has a surface in contact with the convex-concave layer 33 and a surface in contact with the second transparent layer 35 formed in the same shape. For this reason, the reflective layer 34 may reflect projected video light on either one of the surface in contact with the convex-concave layer 33 and the surface in contact with the second transparent layer 35.

(Modification, Improvement)

One embodiment of the transparent screen has been described. The present invention is not limited to the embodiment. Various modification and improvements are made possible within the scope of the present invention.

Figure 23:
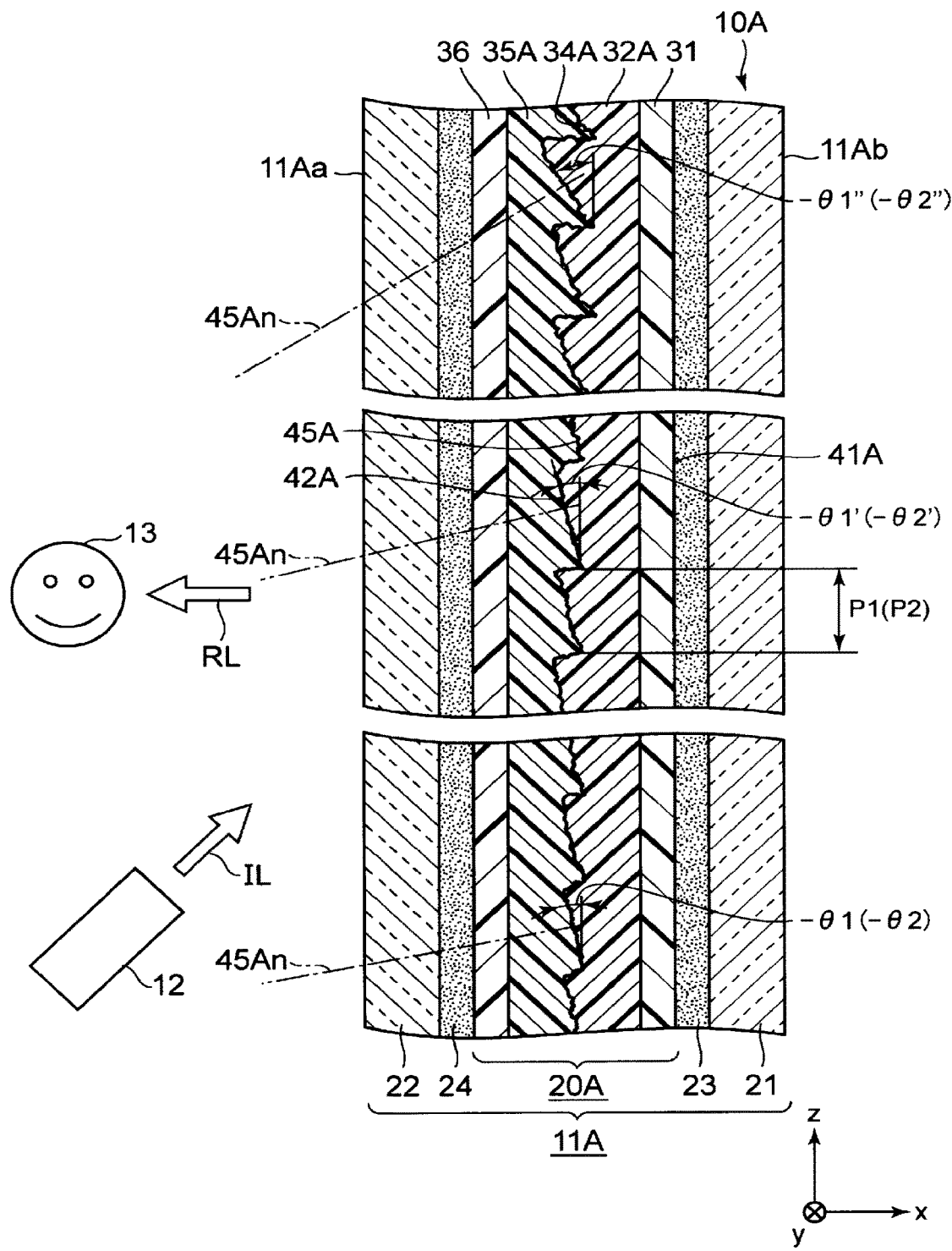
FIG. 23 is a schematic view illustrating a modification of the video display system.
Figure 24:
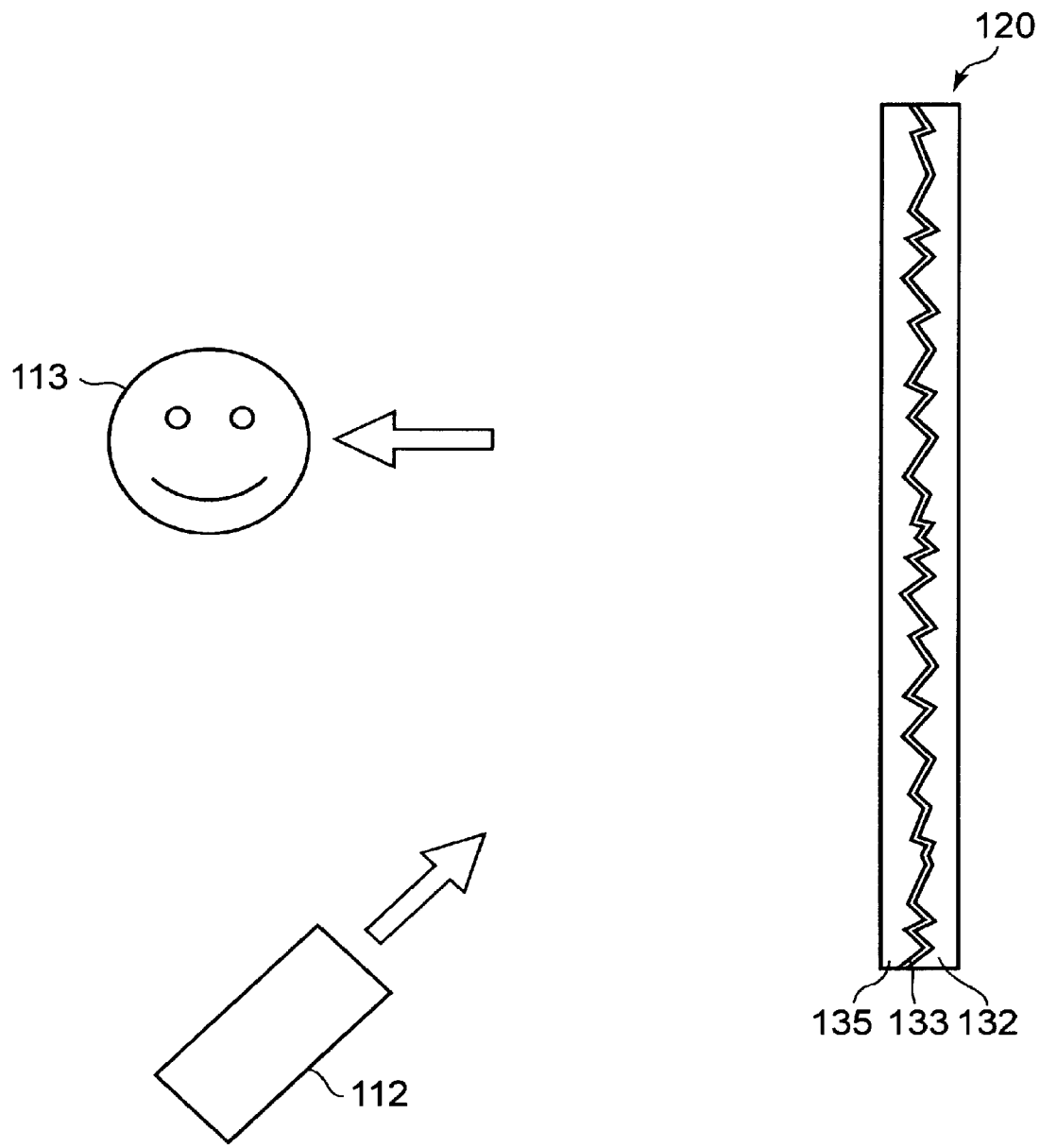
FIG. 24 is a schematic view illustrating a conventional transparent screen.

FIG. 23 is a view illustrating a modification of the video display system according to the embodiment. The video display system 10A according to the modification includes a transparent screen 20A. Now, differences between the modification and the embodiment will be mainly described.

The transparent screen 20A according to the modification is different from the transparent screen 20 according to the embodiment in that the convex-concave layer 33 illustrated in FIG. 2 and so on is absent between a first transparent layer 32A and a reflective layer 34A, and that the reflective layer 34A has contact with the first transparent layer 32A. The transparent screen 20A forms a laminated plate for video projection 11A along with a first transparent plate 21 and a second transparent plate 22.

The first transparent layer 32A includes a plurality of slant surfaces 42A slant to a reference surface 41A. Each of the slant surfaces 42A is formed in a stripe shape as seen from a normal direction of the reference surface 41A. Each of the slant surfaces 42A is provided with a convex-concave formation. As the method for providing the slant surfaces 42A with the convex-concave formation, an etching method or an imprinting process is, for example, applicable.

The etching method is a method for providing the slant surfaces 42A with the convex-concave formation by etching the slant surfaces 42A, which are formed by a pressing process, a cutting method or another method. As the etching process, either a physical etching process or a chemical etching process is applicable.

The physical etching process includes a blasting process. As the blasting process, either a dry blasting process or a wet blasting process is applicable. When the dry blasting process is employed, particles are blasted against the slant surfaces 42A to provide the slant surfaces 42A with the convex-concave formation. The particles may be, for example, alumina particles, silicon carbide particles or zircon particles. When a wet blasting process is employed, a mixed fluid of particles and a liquid is blasted against the slant surfaces 42A to provide the slant surfaces 42A with the convex-concave formation.

As illustrated in FIG. 23, the slant surfaces 42A may be formed such that the slant angles θ1 measured for the respective slant surfaces 42A stepwise or sequentially decreasing from one end in the z direction (for example, a lower end) toward the other end in the z direction (for example, an upper end) in section perpendicular to the y direction in at least part of a video projection area. For example, the uppermost slant surface 42A in FIG. 23 may have a slant angle θ1 (having a negative value) set so as to be smaller than the slant angle θ1 (having a negative value) of the lowermost slant surface 42A in FIG. 23. The slant angles θ1 of the slant surfaces 42A may vary only in a negative range, only in a positive range, or in both of positive and negative ranges. It should be noted that the slant angles θ1 have random values within a certain range of change rates about a central angle, as exemplified in the above-mentioned Experimental Examples, each of certain areas in the z direction (three certain areas are exemplified in FIG. 23).

The slant surfaces 42A have a pitch P1 of, for example, at least 15 μm, preferably at least 20 μm. When the pitch P1 is at least 15 μm, the emission angle of diffracted light having the most intense power among the diffracted light can be decreased to minimize a case where multiple images in a video are recognized as a ghost. The pitch P1 is at most 300 μm. When the pitch P1 is at most 300 μm, the stripe of the slant surfaces 42 is too narrow to be visible to an observer 13.

The slant angles θ1 of the slant surfaces 42A do not have a uniform value, in other words, random values. In FIG. 23, this state is illustrated by −θ1, −θ1', −θ1". By this arrangement, the diffraction of light that is transmitted through the transparent screen 20 from a rear side to a front side can be minimized to reduce a case where a background is visible in multiple images.

The reflective layer 34A is slant to the reference surface 41A and includes a plurality of slant reflective surfaces 45A, which reflect projected video light. Each of the slant reflective surfaces 45A may be formed in a concentric stripe shape as seen from a normal direction of the reference surface 41A. Each of a slant reflective surfaces may be formed in a plurality of concentric stripe shape as in a Fresnel lens, as seen from a normal direction of the reference surface 41.

The reflective layer 34A has a thickness of, for example, 5 nm to 5,000 nm and is formed along the convex-concave formation of the slant surfaces 42A. In other words, each of the slant reflective surfaces 45A has a convex-concave formation. The convex-concave formation of the reflective layer 34A is filled with the second transparent layer 35A.

As illustrated in FIG. 23, the slant reflective surfaces 45A are preferred to be formed such that the slant angles θ2 measured for the respective slant reflective surfaces 45A stepwise or sequentially decreasing from one end in the z direction (for example, a lower end) toward the other end in the z direction (for example, an upper end) in section perpendicular to the y direction in at least part of a video projection area where a video is projected. For example, the uppermost slant reflective surface 45A in FIG. 23 may have a slant angle θ2 (having a negative value) set so as to be smaller than the slant angle θ2 (having a negative value) of the lowermost slant reflective surface 45A in FIG. 23. The most intensive light among the light scattered and reflected by each of the slant reflective surfaces 45A at different positions in the z direction can be directed toward an observer 13. Thus, the difference between the brightness in a central portion of a video and the brightness in a peripheral portion of the video can be reduced to provide a direction where the video can be wholly observed brightly. The slant angles θ2 of the slant reflective surfaces 45A may vary only in a negative range, only in a positive range, or in both of positive and negative ranges. It should be noted that the slant angles θ2 have random values within a certain range of change rates about a central angle, as exemplified in the above-mentioned Experimental Examples, each of certain areas in the z direction (three certain areas are exemplified in FIG. 23).

The respective slant reflective surfaces 45 in at least part of the video projection area may be formed such that the formula of $\theta 2 = (\alpha' + \beta')/2$ is established in section perpendicular to the y direction. In this case, the most intensive light among the light scattered and reflected by each of the slant reflective surfaces can be directed toward the observer 13. Thus, the difference between the brightness in a central portion of a video and the brightness in a peripheral portion of the video can be reduced to provide a direction where the video can be wholly observed brightly.

As illustrated in FIG. 23, the slant reflective surfaces 45A may be formed to have normal lines 45An brought closer to each other toward the front side from the transparent screen 20A in section perpendicular to the y direction in at least part of a video projection area. This arrangement can provide a direction where a video can be wholly observed brightly. It should be noted that the direction of the normal line 45An of each of the slant reflective surfaces 45A can be represented by θ2+90° or θ2−90°.

The slant reflective surfaces 45A have a pitch P1 of, for example, at least 15 μm, preferably at least 20 μm. When the pitch P2 is at least 15 μm, the emission angle of diffracted light having the most intense power among the diffracted light can be decreased to minimize a case where multiple images in a video are recognized as a ghost. The pitch P2 is at most 300 μm. When the pitch P2 is at most 300 μm, the stripe of the slant reflective surfaces 45A is too narrow to be visible to an observer 13. In the case of a slant reflective surface 45A and a slant surface 42 that are present at the same position in the z direction, the pitch P2 of the slant reflective surface 45A in the z direction and the pitch P1 of the slant surface 42 in the z direction have substantially the same value.

In accordance with the modification, the slant reflective surfaces 45A for displaying a video are slant to a surface where a hot spot is generated (a front surface 11a or a rear surface 11b) as in the embodiment. Accordingly, it is possible to separate a direction where a hot spot is observed and a direction where a bright video is observed with the result that a position where a video is brightly observed without observing a hot spot (for example, the position of the observer 13 indicated by solid lines in FIG. 23) is established.

In accordance with the modification, The slant reflective surfaces 45A are preferred to be formed such that the slant angles θ2 measured for the respective slant reflective surfaces 45A stepwise or sequentially decreasing from one end in the z direction (for example, a lower end) toward the other end in the z direction (for example, an upper end) in section perpendicular to the y direction in at least part of a video projection area where a video is projected as in the embodiment. When the slant reflective surfaces are formed in this way, the most intensive light among the light scattered and reflected by each of the slant reflective surfaces 45A at different positions in the z direction can be directed toward the observer 13. Thus, the difference between the brightness in a central portion of a video and the brightness in a peripheral portion of the video can be reduced to provide a direction where the video can be wholly observed brightly.

Although a resin layer is used as each of the first transparent layers 32, 32A in the embodiment and the modification, a glass layer may be used. As the method for forming a plurality of slant surfaces in a stripe shape on the glass layer, a pressing process is, for example, applicable.

The first transparent plate 21 may be used as the first transparent layers 32, 32A. When the first transparent plate 21 is a glass plate, a bending process and a pressing process may be simultaneously performed by press molding.

When the first transparent plate 21 is employed as the first transparent layer 32, the convex-concave layer 33 and the reflective layer 34 are formed on the first transparent plate 21. When the first transparent plate 21 is employed as the first transparent layer 32A, the reflective layer 34A is formed on the first transparent plate 21.

It is acceptable that the second adhesive layer 24 is used as the second transparent layers 35, 35A and that the second transparent plate 22 is used instead of the protective sheet 36.

The second transparent layers 35, 35A may be formed by a transparent resin material having a ring structure or a multi-functional group or a transparent resin material having a ring structure and a multi-functional group. When the transparent resin material is employed, the transparent layers can be provided with rigidity and hardness to improve the handling of the transparent screens 20, 21A which is preferred. Specifically, it is preferred to employ a transparent resin material that includes, in an amount of at least 10% of the total weight, at least one kind structure selected from the group consisting of an adamantane skeleton, a tricyclodecane skeleton and a fluorene skeleton.

As the second transparent layers 35, 35A, a transparent resin material, which has a hard coat layer or an anti-reflective film formed on a PET resin, may be employed. Further, the PET resin may have a half mirror for forming of a virtual image, disposed so as to be employed in a HUD.

When a transparent resin material having a sufficient surface hardness and a sufficient transparency as mentioned above is employed as the second transparent layers 35, 35A, the transparent screen 20 may be configured such that the second transparent layer 35 or 35A formed by the transparent resin material is disposed as the outermost layer while none of the protective sheet 36, the second adhesive layer 24 and the second transparent plate 22 are disposed.

In the embodiment and the modification, the step of forming each of the slant surfaces 42 and 42A in a stripe shape, and the step of providing each of the slant surfaces 42 and 42A with the convex-concave formation are performed in this order. Nevertheless, these steps may be simultaneously performed. For example, when the convex-concave pattern surface of the mold 60 is roughened by etching in advance in the case of a pressing process, these steps can be simultaneously performed.

The laminated plates for video projection 11, 11A and so on may further include a functional layer. As the functional layer, a light anti-reflective layer for reducing the reflection of light, a light attenuating layer for attenuating part of light, an infrared shielding layer for reducing the transmission of infrared light and so on are mentioned for example. Further, as the functional layer, a vibration layer, which is vibrated by application of a voltage to function as a speaker, a sound isolation layer for reducing the transmission of a sound, and so on are mentioned. There is no particular limitation to the number and the position of such functional layers.

This application is a continuation of PCT Application No. PCT/JP2018/042019, filed on Nov. 13, 2018, which is based upon and claims the benefit of priority from Japanese Patent Application No. 2017-243475 filed on Dec. 20, 2017. The contents of those applications are incorporated herein by reference in their entireties.

REFERENCE A SYMBOLS

10: video display system, 11: laminated plate for video projection, 12: projector, 13: observer, 20: transparent screen, 21: first transparent plate, 22: second transparent plate, 31: substrate sheet, 32: first transparent layer, 33: convex-concave layer, 34: reflective layer, 35: second transparent layer, 36: protective sheet, 37: particle, 38: matrix, 41: reference surface, 42: slant surface, 45: slant reflective surface

What is claimed is:

1. A transparent screen comprising a first transparent layer, a reflective layer reflecting projected video light, a second transparent layer disposed opposite to the first transparent layer with respect to the reflective layer so as to make a background visible therethrough;
    wherein the reflective layer has a plurality of slant reflective surfaces, each of the slant reflective surface being slant to a reference surface that is a surface of the first transparent layer opposite to the reflective layer;
    wherein each of the slant reflective surfaces is provided with a concavo-convex and is formed in a stripe shape when seen from a normal direction of the reference surface; and
    wherein the slant reflective surfaces are formed so as to have randomly variable angles to the reference surface, the angle changing with random variations in a certain amount of range with respect to a certain central angle.

2. The transparent screen according to claim 1, wherein the variations include discrete values in the certain amount of range.

3. The transparent screen according to claim 1, wherein the first transparent layer includes a plurality of slant surfaces slant to the reference surface in the same direction as one another;
    wherein each of the slant surfaces is formed in a stripe shape when seen from a normal direction of the reference surface;
    wherein the transparent screen further comprises a concavo-convex layer disposed between the first transparent layer and the reflective layer so as to provide the slant surfaces of the first transparent layer with a concavo-convex;
    wherein the concavo-convex layer includes particles and a matrix and has a concavo-convex on a surface in contact with the reflective layer; and
    wherein the slant reflective surfaces are formed along the concavo-convex of the concavo-convex layer.

4. The transparent screen according to claim 1, wherein the first transparent layer includes a plurality of slant surfaces slant to the reference surface in the same direction as one another;
    wherein each of the slant surfaces is provided with a concavo-convex and is formed in a stripe shape when seen from a normal direction of the reference surface; and
    wherein the slant reflective surfaces are formed along the concavo-convex of the slant surfaces.

5. The transparent screen according to claim 1, wherein a step surface is formed between adjacent slant surfaces to connect the adjacent slant surfaces.

6. The transparent screen according to claim 5, wherein a ratio (PV1/P1) of a height PV1 of the step surfaces to a pitch P1 of the step surfaces in a direction where the slant surfaces are side by side is at most 0.6.

7. The transparent screen according to claim 1, wherein the reflective layer includes at least one of a metal layer and a dielectric layer.

8. The transparent screen according to claim 1 wherein the transparent screen has a haze value of at most 10%.

9. A laminated plate for video projection, comprising the transparent screen recited in claim 1, a first transparent plate disposed on a side of the transparent screen, and a second transparent plate disposed on an opposite side of the transparent screen.

10. The laminated plate for video projection according to claim 9, which is employed as a windowpane of a vehicle.

11. A video display system comprising the transparent screen recited in claim 1, and a projector projecting a video on the transparent screen.

12. A process for producing a transparent screen, which comprises a first transparent layer, a reflective layer reflecting projected video light, and a second transparent layer disposed opposite to the first transparent layer with respect to the reflective layer so as to make a background visible therethrough; the process comprising:

a step of forming a plurality of slant surfaces on a surface of the first transparent layer opposite to a reference surface that is a surface of the first transparent layer opposite to the reflective layer, the slant surfaces being slant to the reference surface and being formed in a stripe shape when seen from a normal direction of the reference surface, a step of providing each of slant surfaces with a concavo-convex;

a step of disposing the reflective layer in contact with the concavo-convex; and a step of disposing a second transparent layer so as to fill a concavo-convex of the reflective layer;

wherein the slant reflective surfaces are formed so as to have angles to the reference surface, the angles changing with random variations in a certain amount of range with respect to a certain central angle.

13. The process for producing a transparent screen according to claim 12, wherein the variations include have discrete values in the certain amount of range.

14. The process for producing a transparent screen according to claim 12, wherein the step of providing each of slant surfaces with a concavo-convex comprises a deposition method to apply a liquid containing particles and a matrix, to the slant surfaces and dry the liquid.

15. The process for producing a transparent screen according to claim 12, wherein the step of providing each of slant surfaces with a concavo-convex comprises an etching method to etch the slant surfaces.

16. The process for producing a transparent screen according to claim 12, wherein the step of forming a plurality of slant surfaces comprises a pressing process to transfer a concavo-convex pattern of a mold onto the first transparent layer.

17. The process for producing a transparent screen according to claim 12, wherein the step of forming a plurality of slant surfaces comprises a cutting method to cut the first transparent layer by a cutting tool.

* * * * *